(12) United States Patent
Kehrl et al.

(10) Patent No.: US 9,096,305 B2
(45) Date of Patent: Aug. 4, 2015

(54) CURVED COMPOSITE FRAMES AND METHOD OF MAKING THE SAME

(71) Applicant: The Boeing Company, Chicago, IL (US)

(72) Inventors: David J. Kehrl, Everett, WA (US); Kent E. Johnson, Kenmore, WA (US); Douglas A. McCarville, Orting, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 13/684,988

(22) Filed: Nov. 26, 2012

(65) Prior Publication Data

US 2013/0084434 A1  Apr. 4, 2013

Related U.S. Application Data

(60) Division of application No. 12/776,781, filed on May 10, 2010, now Pat. No. 8,349,105, which is a continuation-in-part of application No. 12/396,418, filed on Mar. 2, 2009, which is a continuation-in-part of application No. 12/104,529, filed on Apr. 17, 2008.

(51) Int. Cl.
*B64C 1/06* (2006.01)
*B29C 70/20* (2006.01)
(Continued)

(52) U.S. Cl.
CPC .............. *B64C 1/061* (2013.01); *B29C 70/207* (2013.01); *B29C 70/30* (2013.01); *B29C 70/38* (2013.01); *B64C 1/064* (2013.01); *B29L 2031/3082* (2013.01); *B64C 2001/0072* (2013.01); *Y02T 50/433* (2013.01); *Y10T 29/49622* (2015.01); *Y10T 29/49801* (2015.01); *Y10T 29/49826* (2015.01); *Y10T 428/24628* (2015.01)

(58) Field of Classification Search
CPC .......... B64C 1/06; B64C 1/061; B64C 1/062; B64C 1/064; B64C 1/065; B64C 1/068; B64C 1/069; B64C 1/08; B64C 1/12; B64C 2001/0054; B64C 2001/0072
USPC ............................. 244/117 R, 119, 131, 132
See application file for complete search history.

(56) References Cited

U.S. PATENT DOCUMENTS 3,042,562 A   7/1962  Peterson
3,259,021 A   7/1966  Appleton et al.
(Continued)

FOREIGN PATENT DOCUMENTS

DE   3223231 A1   1/1983
DE   3249987 C2   8/1995
(Continued)

OTHER PUBLICATIONS

International Search Report, dated Feb. 15, 2007, regarding Application No. PCT/US2006/016191, 5 pages.
(Continued)

*Primary Examiner* — Tien Dinh
*Assistant Examiner* — Richard R Green
(74) *Attorney, Agent, or Firm* — Yee & Associates, P.C.

(57) ABSTRACT

A curved composite aircraft frame comprises a multi-ply composite laminate having a generally Z-shaped cross section. At least certain of the laminate plies include unidirectional reinforcing fibers that are substantially tangent at substantially all points along the curvature of the frame.

25 Claims, 15 Drawing Sheets

(51) Int. Cl.
*B29C 70/30* (2006.01)
*B29C 70/38* (2006.01)
*B64C 1/00* (2006.01)
*B29L 31/30* (2006.01)

(56) References Cited

U.S. PATENT DOCUMENTS

| | | | |
|---|---|---|---|
| 3,556,922 A | 1/1971 | Green et al. | |
| 3,775,219 A | 11/1973 | Karlson et al. | |
| 4,133,711 A | 1/1979 | August et al. | |
| 4,208,238 A | 6/1980 | August et al. | |
| 4,249,704 A | 2/1981 | Sakaue et al. | |
| 4,305,903 A | 12/1981 | Krause | |
| 4,475,976 A | 10/1984 | Mittelstadt et al. | |
| 4,541,886 A | 9/1985 | Marlow et al. | |
| 4,576,849 A | 3/1986 | Gardiner | |
| 4,588,466 A | 5/1986 | Eaton | |
| 4,591,402 A | 5/1986 | Evans et al. | |
| 4,696,707 A | 9/1987 | Lewis et al. | |
| 4,707,214 A | 11/1987 | Nithart et al. | |
| 4,720,255 A | 1/1988 | Mittelstadt | |
| 4,726,924 A | 2/1988 | Mittelstadt | |
| 4,750,965 A | 6/1988 | Pippel et al. | |
| 4,847,063 A | 7/1989 | Smith | |
| 4,867,834 A | 9/1989 | Alenskis et al. | |
| 4,955,803 A | 9/1990 | Miller et al. | |
| 5,038,291 A | 8/1991 | Wang et al. | |
| 5,242,523 A | 9/1993 | Willden et al. | |
| 5,292,475 A | 3/1994 | Mead et al. | |
| 5,431,749 A | 7/1995 | Messner | |
| 5,431,984 A | 7/1995 | Keck et al. | |
| 5,492,979 A | 2/1996 | Pater | |
| 5,538,589 A | 7/1996 | Jensen et al. | |
| 5,648,109 A | 7/1997 | Gutowski et al. | |
| 6,355,133 B1 | 3/2002 | Williams | |
| 6,451,152 B1 | 9/2002 | Holmes et al. | |
| 6,454,893 B1 | 9/2002 | McKague, Jr. | |
| 6,547,910 B1 | 4/2003 | Benzing et al. | |
| 6,595,467 B2 * | 7/2003 | Schmidt | 244/119 |
| 6,613,258 B1 | 9/2003 | Maison et al. | |
| 6,648,273 B2 * | 11/2003 | Anast | 244/119 |
| 6,723,271 B2 | 4/2004 | Hemphill et al. | |
| 7,008,580 B2 | 3/2006 | Eberth et al. | |
| 7,056,402 B2 | 6/2006 | Koerwien et al. | |
| 7,115,180 B2 | 10/2006 | Bruyere | |
| 7,134,629 B2 | 11/2006 | Johnson et al. | |
| 7,137,182 B2 | 11/2006 | Nelson | |
| 7,175,795 B2 | 2/2007 | Eberth et al. | |
| 7,469,735 B2 | 12/2008 | Brown et al. | |
| 7,513,769 B2 | 4/2009 | Benson et al. | |
| 7,527,222 B2 | 5/2009 | Biornstad et al. | |
| 7,544,261 B1 | 6/2009 | Vines et al. | |
| 7,670,525 B2 | 3/2010 | Weidmann et al. | |
| 7,790,082 B2 | 9/2010 | Buge et al. | |
| 7,842,145 B2 | 11/2010 | Hogg | |
| 7,943,076 B1 | 5/2011 | Hawkins et al. | |
| 8,151,529 B2 | 4/2012 | Weidmann et al. | |
| 2002/0149134 A1 | 10/2002 | Hemphill et al. | |
| 2003/0168775 A1 | 9/2003 | Eberth et al. | |
| 2003/0173019 A1 | 9/2003 | Eberth et al. | |
| 2004/0074587 A1 | 4/2004 | Koerwien et al. | |
| 2005/0056362 A1 | 3/2005 | Benson et al. | |
| 2005/0067731 A1 | 3/2005 | Bruyere | |
| 2005/0263645 A1 | 12/2005 | Johnson et al. | |
| 2006/0073309 A1 | 4/2006 | Hogg | |
| 2006/0216480 A1 | 9/2006 | Weidmann et al. | |
| 2006/0216490 A1 | 9/2006 | Ishii et al. | |
| 2006/0249868 A1 | 11/2006 | Brown et al. | |
| 2007/0029038 A1 | 2/2007 | Brown et al. | |
| 2007/0161483 A1 | 7/2007 | Raf | |
| 2007/0175575 A1 * | 8/2007 | Rubin et al. | 156/221 |
| 2008/0230652 A1 | 9/2008 | Biornstad et al. | |
| 2009/0261199 A1 | 10/2009 | McCarville et al. | |
| 2009/0263618 A1 | 10/2009 | McCarville et al. | |
| 2011/0097554 A1 | 4/2011 | Kehrl et al. | |
| 2012/0076973 A1 | 3/2012 | Guzman et al. | |
| 2014/0069576 A1 | 3/2014 | Brown et al. | |

FOREIGN PATENT DOCUMENTS

| | | | |
|---|---|---|---|
| EP | 0496695 A2 | 7/1992 | |
| EP | 1666353 A1 | 6/2006 | |
| EP | 1800840 A1 | 6/2007 | |
| EP | 1804146 A1 | 7/2007 | |
| EP | 1995040 A1 | 11/2008 | |
| EP | 1995046 A2 | 11/2008 | |
| EP | 2233625 A1 | 9/2010 | |
| FR | 2515106 A1 | 4/1983 | |
| FR | 2635484 A1 | 2/1990 | |
| GB | 763972 A | 12/1956 | |
| GB | 2467417 A | 8/2010 | |
| JP | 2003317547 A | 11/2003 | |
| JP | 2004276393 A | 10/2004 | |
| WO | WO9922932 A1 | 5/1999 | |
| WO | WO03099545 A1 | 12/2003 | |
| WO | WO2005011961 A1 | 2/2005 | |
| WO | WO2006070015 A1 | 7/2006 | |
| WO | WO2006119002 A2 | 11/2006 | |
| WO | WO 2006136560 A1 * | 12/2006 | |
| WO | WO2007018935 A1 | 2/2007 | |
| WO | WO 2007102573 A1 * | 9/2007 | |
| WO | WO2009129007 A2 | 10/2009 | |
| WO | WO2010101741 A2 | 9/2010 | |
| WO | WO2012102810 A1 | 8/2012 | |

OTHER PUBLICATIONS

European Patent Office Communication, dated Oct. 14, 2009, regarding Application No. EP06769909.0, 3 pages.
Combined Search and Examination Report, dated May 12, 2010, regarding Application No. GB1000777.1, 6 pages.
International Search Report, dated Oct. 31, 2006, regarding Application No. PCT/US2006/027067, 2 pages.
International Search Report and Written Opinion of the International Searching Authority, dated Oct. 29, 2009, regarding Application No. PCT/US2009/037073, 9 pages.
International Search Report and Written Opinion of the International Searching Authority, dated Nov. 5, 2010, regarding Application No. PCT/US2010/025110, 8 pages.
International Search Report and Written Opinion of the International Searching Authority, dated Apr. 15, 20112, regarding Application No. PCT/US2011/066763, 13 pages.
Dickson et al., "Design and Analysis of a Stiffened Composite Fuselage Panel," NASA Contractor Report 159302, Aug. 1980, 52 pages.
"Fabrics and Preforms," In: ASM Handbook vol. 21: Composites, Miracle et al. (Eds.), ASM International, Materials Park, OH, Dec. 2001, pp. 64-65.
Shirinzadeh et al., Trajectory for Open-Contoured Structures in Robotic Fibre Placement, Robotics and Computer-Integrated Manufacturing, vol. 23, No. 4, Mar. 2007, pp. 380-394.
Office Action, dated Dec. 23, 2008, regarding U.S. Appl. No. 11/119,756, 13 pages.
Final Office Action, dated Jun. 18, 2009, regarding U.S. Appl. No. 11/119,756, 13 pages.
Office Action, dated Sep. 28, 2010, regarding U.S. Appl. No. 11/119,756, 18 pages.
Final Office Action, dated Feb. 14, 2011, regarding U.S. Appl. No. 11/119,756, 14 pages.
Office Action, dated Sep. 19, 2011, regarding U.S. Appl. No. 11/119,756, 14 pages.
Final Office Action, dated Feb. 29, 2012, regarding U.S. Appl. No. 11/119,756, 17 pages.
Office Action, dated Nov. 8, 2010, regarding U.S. Appl. No. 12/363,746, 17 pages.
Notice of Allowance, dated Mar. 29, 2011, regarding U.S. Appl. No. 12/363,746, 8 pages.
Office Action, dated Mar. 5, 2008, regarding U.S. Appl. No. 11/195,786, 15 pages.

(56) References Cited

OTHER PUBLICATIONS

Notice of Allowance, dated Aug. 25, 2008, regarding U.S. Appl. No. 11/195,786, 7 pages.
Office Action, dated Feb. 9, 2011, regarding U.S. Appl. No. 12/104,529, 17 pages.
Final Office Action, dated Oct. 28, 2011, regarding U.S. Appl. No. 12/104,529, 12 pages.
Office Action, dated Jul. 19, 2011, regarding U.S. Appl. No. 12/396,418, 12 pages.
Final Office Action, dated Dec. 30, 2011, regarding U.S. Appl. No. 12/396,418, 9 pages.
Office Action, dated Oct. 18, 2011, regarding U.S. Appl. No. 12/776,781, 15 pages.
Final Office Action, dated May 16, 2012, regarding U.S. Appl. No. 12/776,781, 26 pages.
Notice of Allowance, dated Aug. 17, 2012, regarding U.S. Appl. No. 12/776,781, 12 pages.
Office Action, dated Jan. 11, 2013, regarding U.S. Appl. No. 11/119,756, 38 pages.
Klenner, "Evaluation and Selection Algorithms of Cost-Optimised Prepreg Application Methods in the Context of Manufacturing Highly Stressed Aircraft Components of Fibre-Reinforced Plastic," Doctoral Dissertation, Technische Universitat Carolo-Wilhelmina zu Braunschweig (DE), Apr. 5, 1988, pp. 9, 18-25, 55-56, 64-68, & 154-156.
Office Action, dated May 23, 2013, regarding U.S. Appl. No. 13/013,097, 42 pages.
Office Action, dated Dec. 27, 2013, regarding U.S. Appl. No. 12/104,529, 52 pages.
Final Office Action, dated Nov. 19, 2013, regarding U.S. Appl. No. 13/013,097, 24 pages.
Office Action, dated May 21, 2014, regarding U.S. Appl. No. 13/013,097, 13 pages.
Final Office Action, dated Aug. 14, 2014, regarding U.S. Appl. No. 12/104,529, 17 pages.
Office Action, dated Feb. 25, 2014, regarding U.S. Appl. No. 12/396,418, 45 pages.
Office Action, dated Nov. 25, 2014, regarding U.S. Appl. No. 12/104,529, 7 pages.
Final Office Action, dated Feb. 5, 2015, regarding U.S. Appl. No. 12/104,529, 17 pages.
Final Office Action, dated Dec. 31, 2014, regarding U.S. Appl. No. 13/013,097, 18 pages.
Notice of Allowance, dated Sep. 5, 2014, regarding U.S. Appl. No. 12/396,418, 16 pages.
Chinese Patent Office Action and English Translation, dated Dec. 29, 2014, regarding Application No. 201180065977.6, 17 pages.

\* cited by examiner

CURVED COMPOSITE FRAMES AND METHOD OF MAKING THE SAME

CROSS REFERENCE TO RELATED APPLICATIONS

This application is a divisional of application Ser. No. 12/776,781, filed May 10, 2010, status Pending, which is a continuation-in-part of application Ser. No. 12/396,418, filed Mar. 2, 2009, status Pending, and is a continuation-in-part of application Ser. No. 12/104,529, filed Apr. 17, 2008, status Pending.

TECHNICAL FIELD

This disclosure generally relates to composite structures such as airframe components, and deals more particularly with a curved, one-piece composite frame section for an aircraft fuselage having an integral shear tie, and a method for making the same.

BACKGROUND

Highly contoured, multi-leg structures having high strength and lightweight may be used in various applications, such as in aerospace vehicles. A variety of frames and similar structures used in aerospace applications may have legs which are highly curved or contoured along the length of the structure. For example, hoop shaped frame sections for an aircraft fuselage may be formed from two separate pieces, comprising a C-shaped channel and an L-shaped member jointed together with fasteners. The L-shaped channel acts as a shear tie to which an outer skin of the aircraft is fastened.

The two-piece frame described above requires assembly, separate pieces of tooling and separate inspection processes. Moreover, laminate ply layout is performed using a moving Cartesian coordinate reference which complicates the task of tailoring the laminated plies of the frame to meet various performance requirements, including strength, rigidity and weight. Also, two-piece frames are also relatively expensive to fabricate because of the hand labor needed to assemble the pieces, and additional material requirements, including multiple fasteners.

Accordingly, there is a need for a structural frame for aircraft fuselage applications which reduces weight, material and labor, while meeting the necessary specification for aircraft applications. There is also a need for a high performance structural frame that is suitable for fabrication in a high volume production environment.

SUMMARY

The disclosed embodiments provide a curved composite frame suitable for aircraft applications that is weight efficient and reliable, while able to control deflections and maintain airframe rigidity in the hoop direction of an aircraft fuselage. The disclosed composite frame is of a one-piece construction having an integral shear tie to which an aircraft outer skin may be attached. The frame comprises laminated composite plies including unidirectional reinforcing fibers, with ply/fiber orientations referenced to a polar coordinate system that defines the curvature of the frame. Orientation of the plies within the polar coordinate system allows the fibers within at least certain of the plies to be positioned substantially tangent to the frame curvature at substantially all points along the frame curvature. Maintaining the zero degree plies tangent to the frame curvature allows selection of laminate orientation percentages in the web, inner chord and outer chord of the frame that may increase the modulus of the frame in the hoop direction within the frame's cross section, thereby optimizing structural efficiency and reduced weight. The one-piece frame has an optimized cross sectional shape that allows integration of a shear tie into the frame.

According to one disclosed embodiment, a curved composite aircraft frame comprises a multi-ply composite laminate. At least certain of the laminate plies include unidirectional reinforcing fibers that are substantially tangent at substantially all points along the curvature of the frame. The laminate is of a one piece, unitary construction comprising a web, an inner chord and an outer chord. The inner chord is integrally formed with a web and extends laterally outward from one end of the web. The outer chord is adapted to be fastened to an aircraft outer skin and is also integrally formed with the web. The outer chord extends laterally outward from the other end of the web in a direction opposite that of the inner chord. Each of the plies has a fiber orientation that is aligned within a polar coordinate reference system defining the curvature of the frame.

According to another embodiment, a curved, one-piece aircraft fuselage frame is provided. The frame comprises a web having first and second ends, an inner chord on the first end of the web, and an outer chord on the second end of the web. The web, inner chord and outer chord are integrally formed of laminated plies of fiber reinforced resin and have a cross section in the shape of one of a Z and a J. At least one of the web, the inner chord and the outer chord include plies having unidirectional reinforcing fibers that lie substantially tangent to the curvature of the frame.

According to a further embodiment, a curved composite fuselage frame is provided having an integrated shear tie. The frame comprises a one-piece multi-ply laminate having a cross section defined by a web, an inner chord and an outer chord adapted to be fastened to a skin on the fuselage. The inner and outer chords are respectively positioned on opposite ends of the web and extend outwardly from the web in opposite directions. The laminate has a cross sectional shape substantially in the shape of one of a Z and a J.

In accordance with another embodiment, a method is provided of fabricating a curved, one-piece composite frame for an aircraft fuselage. The method comprises assembling a lay-up of fiber reinforced resin plies and forming the lay-up into a shape having a web, an inner chord and an outer chord. The lay-up is assembled using a polar coordinate system defining the curvature of the frame. Unidirectional reinforcing fibers in at least certain of the plies are oriented substantially tangent to the curvature of the frame. Orienting the unidirectional reinforcing fibers substantially tangent to the curvature of the frame is performed using a computer controlled, automatic fiber placement machine. Forming the lay-up into the Z-shaped cross section includes bending the edges of the lay-up over a tool.

According to still another embodiment, a method is provided of fabricating a curved composite fuselage frame. The method includes assembling a lay-up of composite plies each having unidirectional reinforcing fibers, and forming the lay-up on a curved tool into a cross sectional shape having a web, and oppositely extending chords respectively on opposite ends of the web. Assembling the lay-up includes arranging at least certain of the plies such that their reinforcing fibers are substantially tangent at substantially all points along the curvature of the frame.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
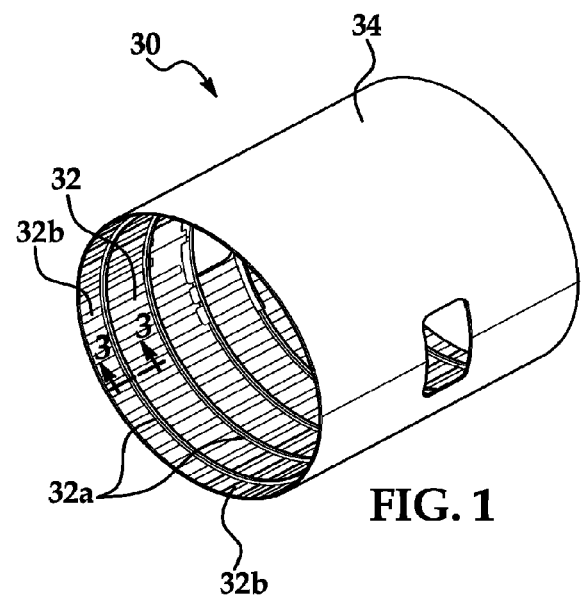
FIG. 1 is a perspective illustration of a barrel section of an aircraft fuselage.
Figure 2:
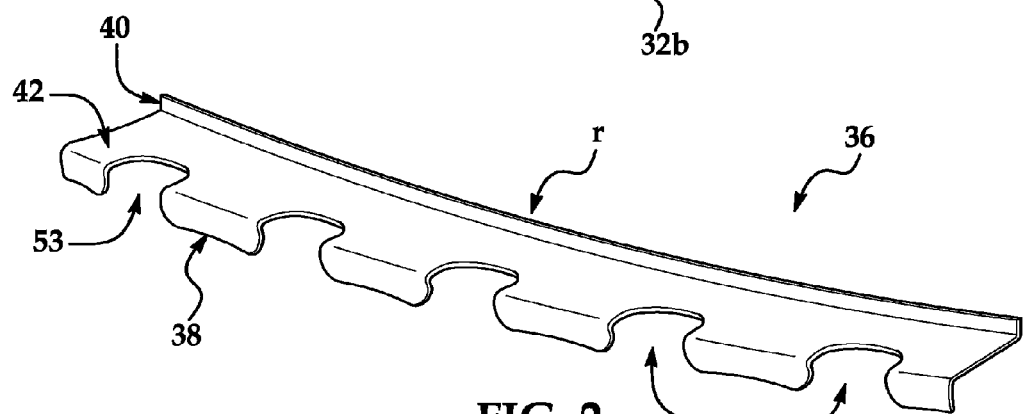
FIG. 2 is a perspective illustration of a highly contoured composite frame section used in the fuselage shown in FIG. 1.
Figure 3:
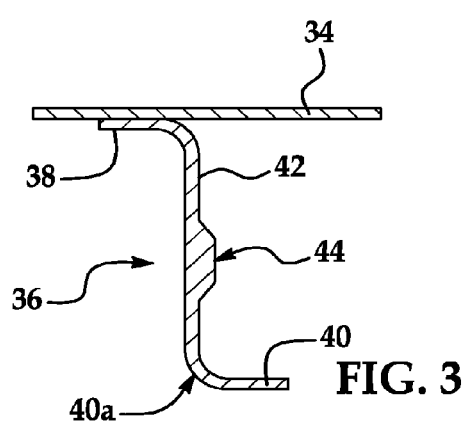
FIG. 3 is a sectional illustration taken along the line 3-3 in FIG. 1.

Referring first to FIGS. 1-3, a barrel shaped fuselage section 30 comprises an outer skin 34 formed over and fastened to a frame structure 32. The frame structure comprises a plurality of longitudinally spaced, barrel frames 32a and longitudinally extending stringers 32b which pass through the barrel frames 32a. Each of the barrel frames 32a may comprise multiple, one-piece frame sections 36 that are spliced together using any suitable means, such as without limitation, splice plates (not shown) and fasteners (not shown). In some applications however, half frame and full frame sections (not shown) may be possible. While the barrel shaped frame 32a are shown in the illustrated embedment as being substantially circular, other frame shapes are possible, including, for example and without limitation, oval or piecewise-circular or other non-circular shapes that have one or more contours or curvatures. As used herein, the terms "contour" and "curved" or "curvature" are used interchangeably.

As best seen in FIG. 3, the one-piece frame section 36 comprises a curved multi-ply laminate having a generally Z-shaped cross section and includes an outer chord 38 connected to an inner chord 40 by a web 42. The inner chord 40 extends laterally from one end of the web 42 in one direction, while the outer chord 38 extends laterally away from the other end of the web 42 in a direction opposite of that of the inner chord 40. The outer and inner chords 38, 40, when viewed in cross section (FIG. 3), effectively form structural legs or flanges that extend traverse to, and are integrally formed with the web 42. In the illustrated embodiment, the chords 38, 40 extend substantially at right angles to the web 42, however in other embodiments the angle between the chords 38, 40 and the web 42 may be more or less than a right angle. The web 42 may include an optional reinforcing pad 44 formed from ply doublers.

Figure 4:
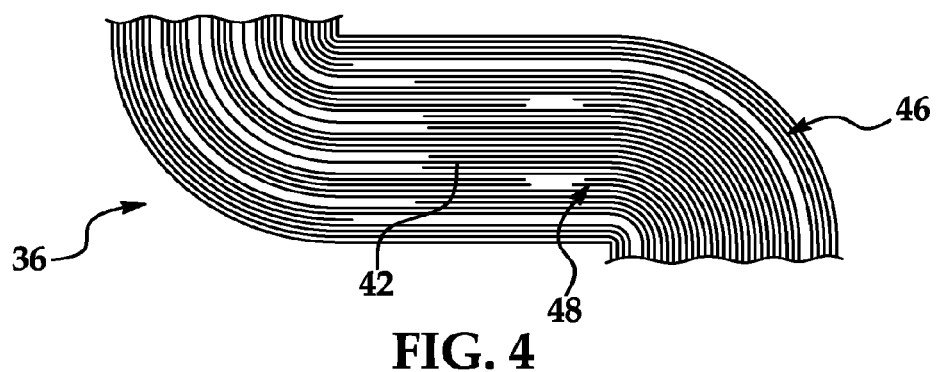
FIG. 4 is a sectional illustration showing a ply buildup for the frame section shown in FIG. 2.

The outer chord 38 forms a shear tie to which the skin 34 may be coupled and/or fastened. The outer chord 38 as well as one edge of the web 42 may include a plurality of spaced apart, mousehole-shaped stringer cutouts 53 through which the stringers 32b extend. As will be discussed below, the frame section 36 is formed from laminated plies of a fiber reinforced synthetic resin, such as carbon fiber epoxy. As shown in FIG. 4, the frame section 36 may include a ply buildup comprising full plies 46 and partial plies 48 which are arranged and oriented to provide maximum structural performance while facilitating the use of a later discussed fabrication method that is both efficient and repeatable.

Figure 3A:
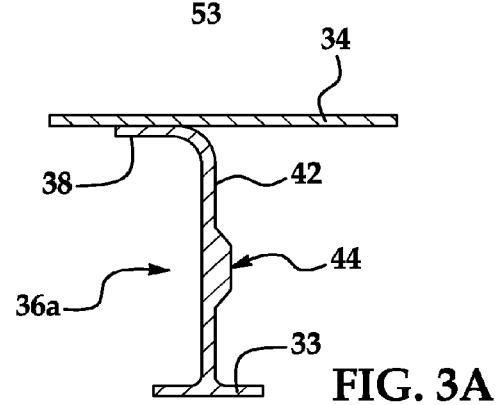
FIG. 3A is an illustration similar to FIG. 3, but showing a frame section having an alternate cross sectional shape.

The one-piece frame section 36 having an integrally formed chord 36 acting as a shear tie 38 may have a cross sectional shape other than a Z-shape, optimized for particular applications. For example, and without limitation, the frame section 36 may have a J-shaped cross section as shown in FIG. 3A, in which the inner chord 33 comprises a cap or flange that extends in opposite directions from, and transverse to the web 42.

Figure 4A:
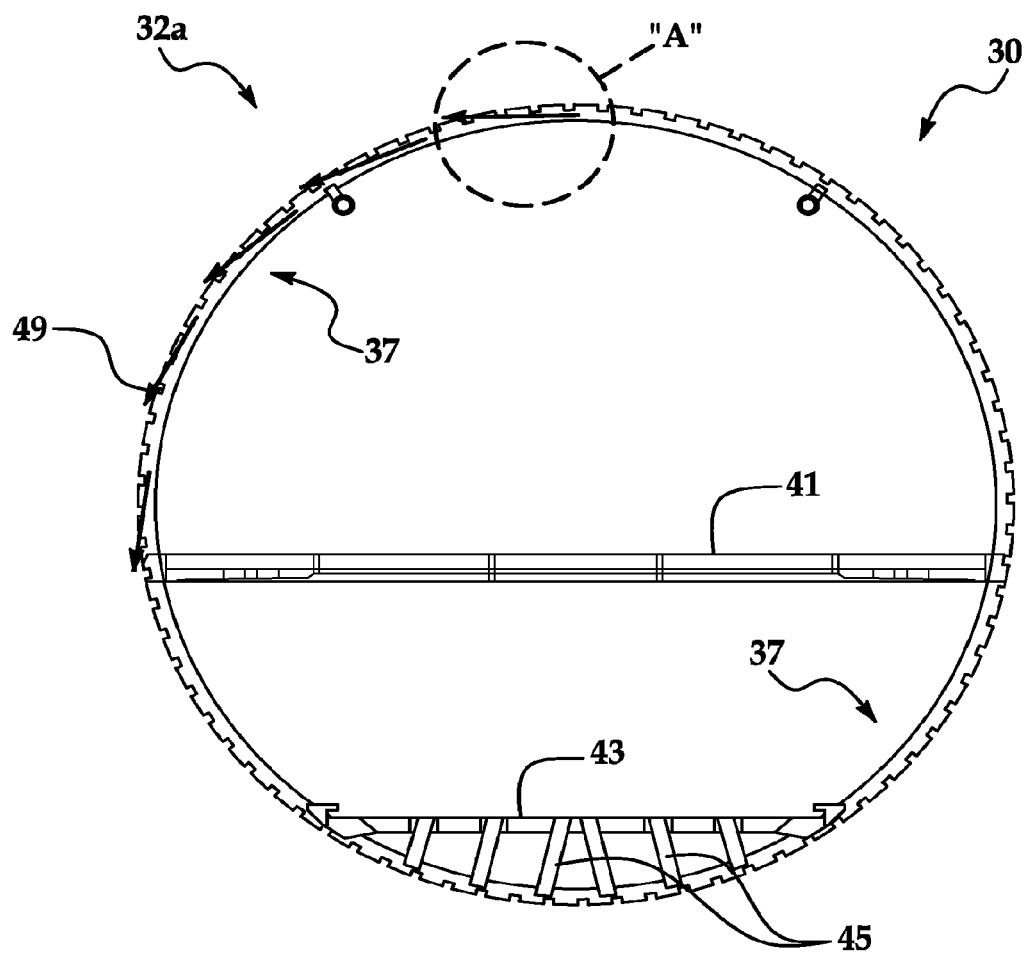
FIG. 4A is an illustration of a cross sectional view of an aircraft fuselage employing a frame according to the disclosed embodiments.
Figure 4B:
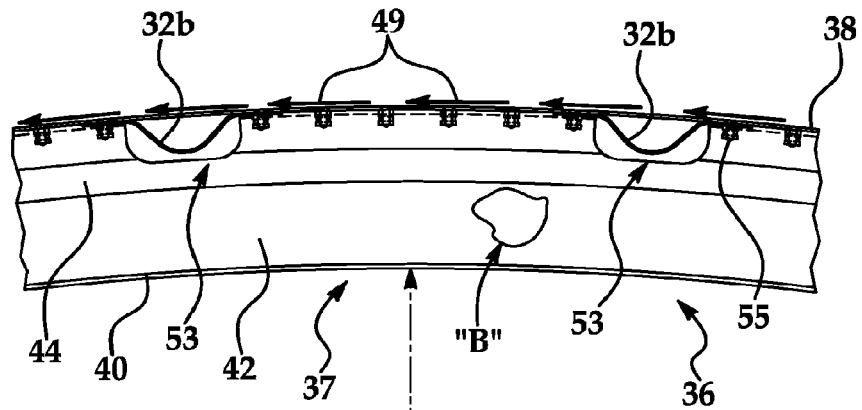
FIG. 4B is an illustration of the area designated as "A" in FIG. 4A.
Figure 4C:
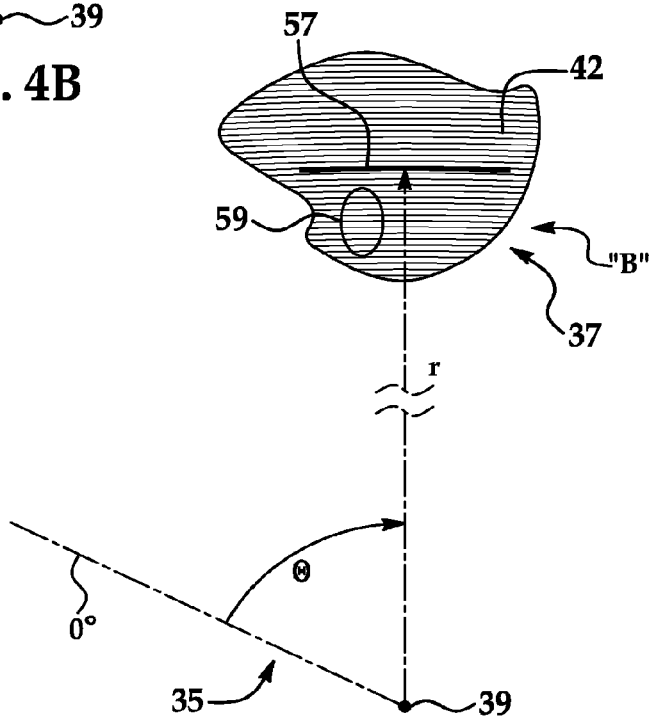
FIG. 4C is an illustration of the area designated as "B" in FIG. 4B.

As shown in FIG. 4A, a typical fuselage section 30 may comprises an upper cabin floor 41, and a lower cargo floor 43 each connected to the frame 32a. The lower, cargo floor 43 may be supported by stanchions 45 which are also secured to the frame 32a. Referring also now to FIGS. 4B and 4C, the frame 32a, including each of the frame sections 36, is designed and laid out based on a polar coordinate reference system 35. A polar coordinate system is a two dimensional coordinate system in which each point on a plane is determined by a distance from a fixed point at an angle from a fixed direction. Thus, in the present example, the polar coordinate system 35 comprises a radial coordinate or a radius "r" extending from a pole 39, and an angle θ which may be referred to as the angular coordinate or polar angle of the radius r relative to a reference axis, herein indicated as 0°. The curvature 37 of each of the frame sections 36 as well as the ply schedule for the frame sections 36 is also based in the polar coordinate system 35. The use of the polar coordinate system 35 to define the frame sections 36 may also allow design optimization by integrating features into a single part while providing the required strength at minimum weight.

Frame design using the polar coordinate system 35 may allow fabrication of composite frame sections 36 having tailored axial stiffness and integrated fail safety. For example, and without limitation, the web 42 may be designed to have increased gauge (thickness), with 0° fiber content in the range of approximately 40% to 50% to meet certain performance requirements. Use of the polar coordinate system 35 in designing the frame sections 36 including ply layout may also permit optimizing the design of other features such as without limitation, the thickness of the inner and outer chords 38, 40 and the pad-up 44, as well as the shape and dimensions of the stringer cutouts 52.

As will be discussed below in more detail, each of the frame sections 36 comprises laminated plies of a synthetic resin reinforced with unidirectional fibers which are laid up according to a predefined ply schedule. Each of the plies may comprise, for example and without limitation, pre-preg tows in the form of slit tape which is laid down on a tool (not shown) during the lay-up process with a fiber orientation based on the polar coordinate system 35. As will be described below, the use of the polar coordinate system 35 to lay-up and orient the pre-preg tape forming the plies allows the fiber orientation of at least certain of the plies, referred to herein as 0° plies, to be positioned tangent to the curvature 37 of the frame sections 36, which corresponds to the hoop direction 49 (FIGS. 4A and 4B) around the frame 32a.

Each of the web 42, inner chord 40 and outer chord 38 may have one or more 0° plies, depending on the particular ply schedule. By maintaining 0° fibers tangent to the hoop direction at substantially all points on the inner chord 40, web 42 and outer chord 38, the laminate orientation percentages may be modified to increase the young's modulus (E) in the hoop direction 49 throughout the frame's cross section. In one embodiment, this modified axial content may be tailored for inner chord 40 to between 40%-50% for 0° plies.

In another embodiment, the inner chord 40 may be tailored with a relatively high axial modulus for inner chord compression loading. The web 42 may have a reduced gauge that may be tailored with lower axial modulus for the inner shear load transfer. The pad-up 44 may be tailored with very high axial modulus. Finally, the inner chord 38 may be tailored with lower axial modulus resulting in higher radial stiffness, fastener bearing and shear load transfer capability.

In accordance with the disclosed embodiment, at least certain of the laminated plies of the frame sections have unidirectional fiber orientations that are substantially tangent to the curvature 37 of the frame section 36, substantially at all points along the curvature 37. Thus, as shown in FIG. 4C, a typical ply 42 within the web 42 includes unidirectional reinforcing fibers 59 that follow the curvature 37 of the frame section 36. The fibers 59 lie along tangent lines 57 that are substantially perpendicular to the radius "r" defining the curvature 37.

Figure 4D:
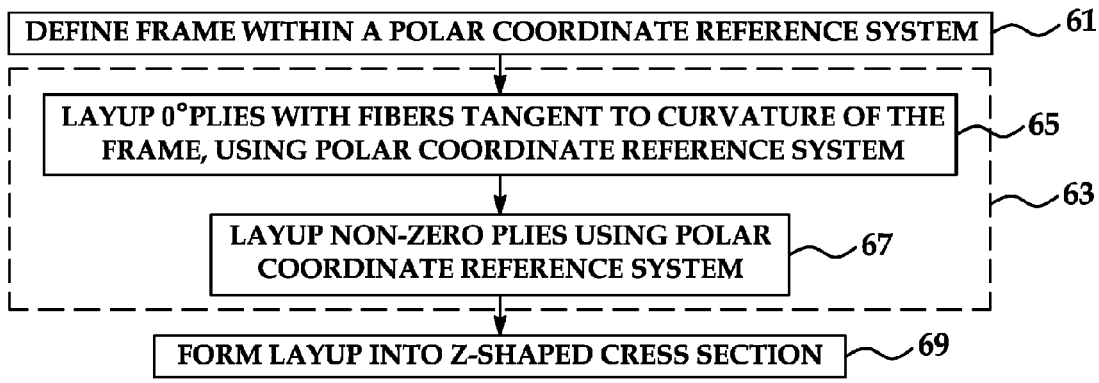
FIG. 4D is an illustration of a simplified flow diagram of a method of fabricating a one-piece frame having an integral shear tie.

Attention is now directed to FIG. 4D which broadly illustrates the steps of a method of fabricating a curved composite frame section 36. Beginning at step 61, the features of the frame section 36 including its contours or curvatures 37, as well as its ply orientations are defined within a polar coordinate reference system 35. A composite lay-up is formed at 63. The layup process 63 includes, at step 65, laying up at least certain plies having 0° unidirectional fiber orientations that are tangent to the curvature 37 of the frame section 36, using the polar coordinate reference system 35. The layup process 63 also includes laying up plies at step 67 having non-0° unidirectional fiber orientations, also based on the polar coordinate reference system 35. When the layup process is complete, the curved layup may be formed into a Z-shaped cross section or a J-shaped cross section using later discussed tooling as shown at step 69.

Figure 5:
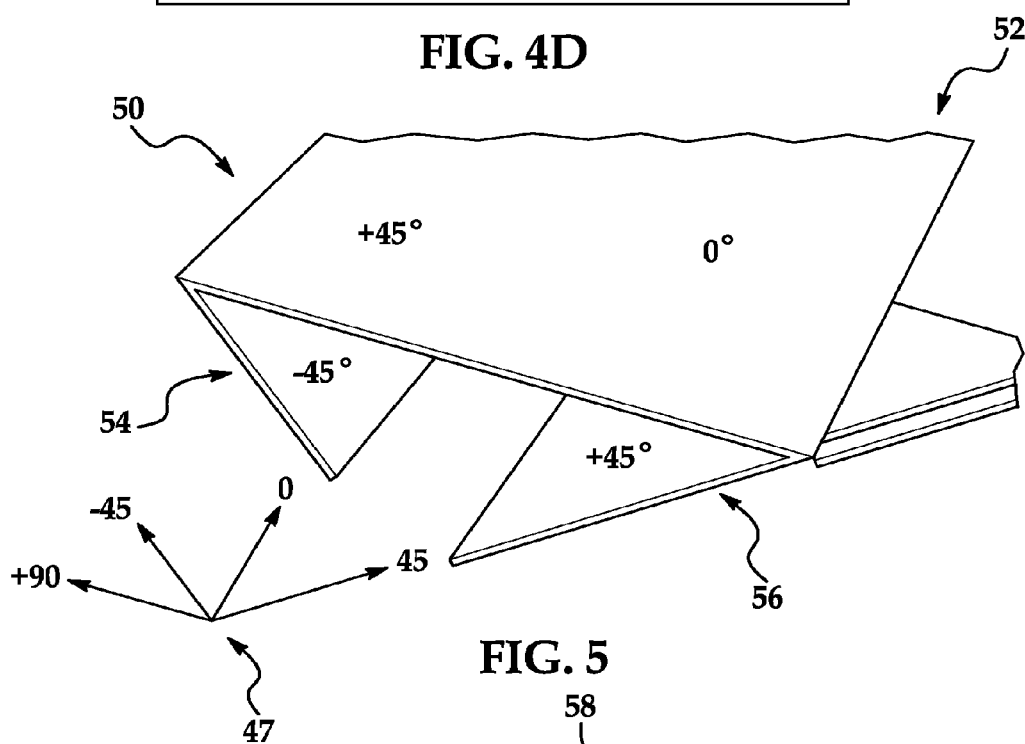
FIG. 5 is a perspective illustration of a flat ply stack used in the fabrication of the frame section shown in FIGS. 2 and 4B.
Figure 6:
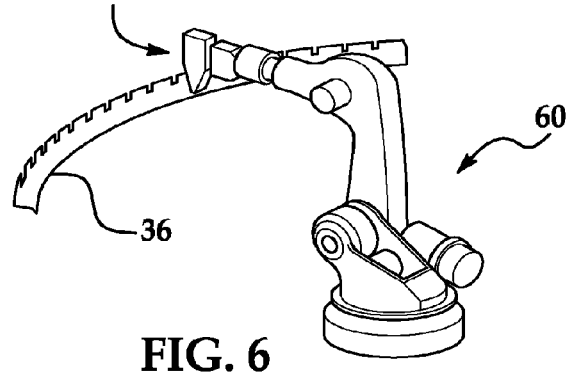
FIG. 6 is a perspective illustration of an AFP robotic machine used to place the stack of plies.
Figure 7:
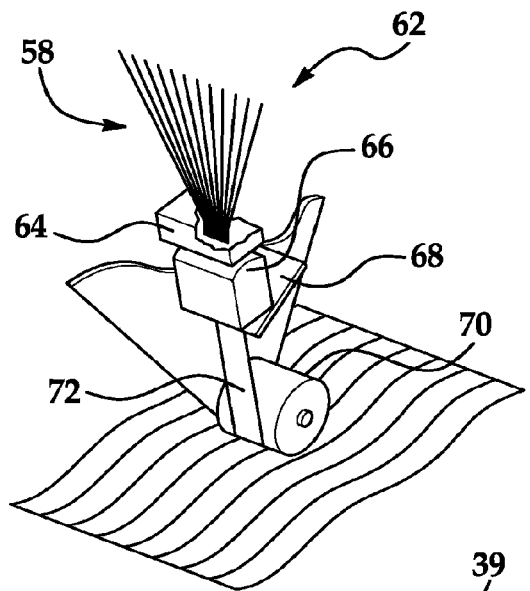
FIG. 7 is a perspective illustration of an AFP machine used as an end defector on the robot shown in FIG. 6.

Referring now to FIGS. 5-7, an AFP machine 58 may be used as an end effector on a robot 60 to laydown fiber tows or strips of fiber pre-preg tape to form a flat ply stack 50. The AFP machine 58 may include combs 64 that receive incoming pre-preg tows 62 that pass through a ribonizer 66 before being severed by a tow cutter 68. The cut tows 72 pass beneath a compliant roller 70 that applies and compacts the tows 62 on a substrate (not shown) or an underlying ply layer (not shown). As best seen in FIG. 5, the AFP machine 58 may be used to laydown fiber tows 62 or tapes in which the fibers are oriented at preselected angles in a Cartesian coordinate system 47. In the illustrated example, the ply stack 50 includes plies 52 having fiber tows oriented at 0 degrees, plies 56 having fiber tows oriented at +45 degrees and plies 54 having fiber tows oriented at −45 degrees. Not shown, but embedded in the ply stack 50 are plies having fiber tows oriented at 90 degrees.

Figure 8:
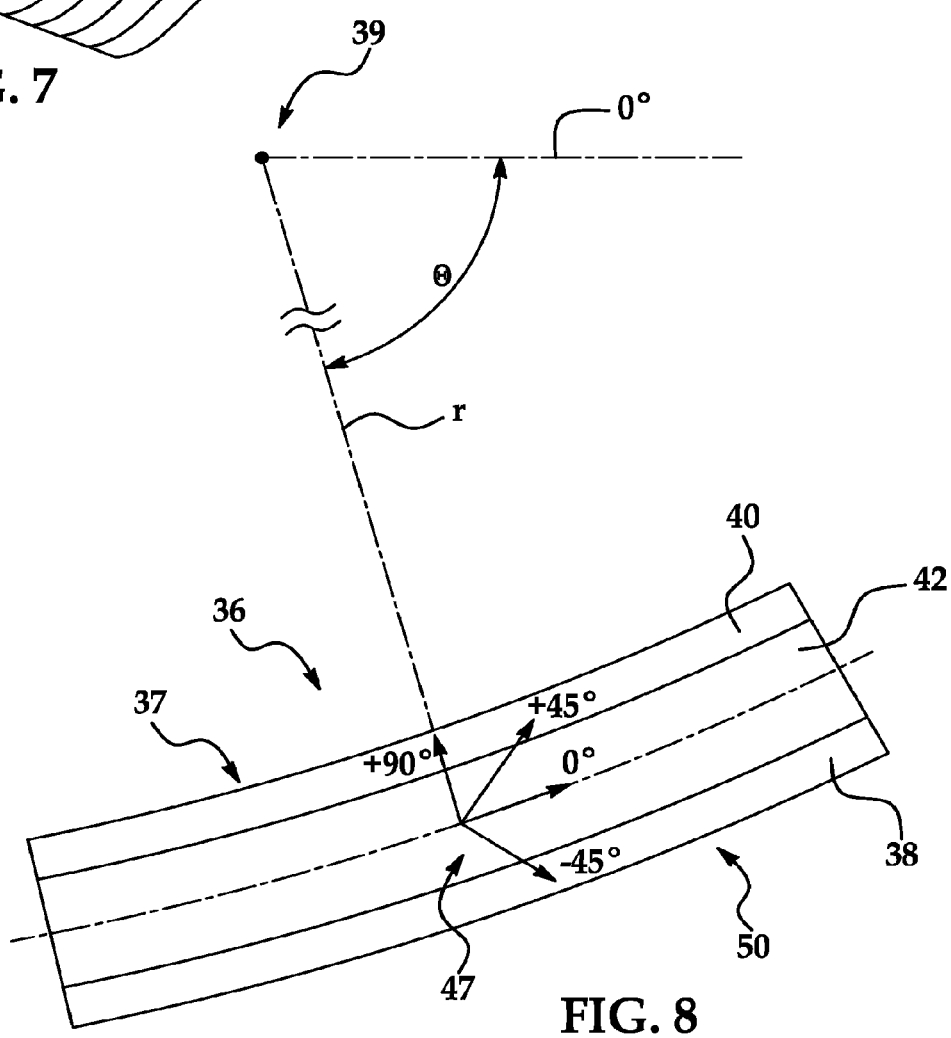
FIG. 8 is a diagrammatic illustration showing the polar and Cartesian coordinate systems used to define ply orientations in the frame sections of FIGS. 2 and 4A.

FIG. 8 better illustrates the relationship between the orientation of a Cartesian coordinate system 47 in which the unidirectional fiber tows or tapes laid down in a ply stack 50, and a polar coordinate system that defines the contour of the frame section 36. The contour of the frame section 36, designated by the numeral 37, may be defined by a radial coordinate "r" originating from a pole 39 and forming a polar angle θ with respect to a reference coordinate indicated as 0°. Thus, each contoured feature of the frame section 36 may be defined by a value "r" (radial coordinate) at an angle θ. It should be note here that although the illustrated frame section 36 has a constant radius (curvature) and the web 42 has a constant gauge (thickness), the curvature of the frame section 36, the gauge of the web 42, the gauge of the inner chord 40 and the gauge of the outer chord 38 each may be variable along the length of the frame section 36.

In the illustrated example, the ply stack 50 is formed by multiple plies 52, 54, 56 in which at least certain of the unidirectional pre-preg fibers are oriented within a Cartesian coordinate system 47 that is tangentially aligned with the radial coordinate "r". As will be discussed below in more detail, in the illustrated example, fiber orientations of 0 degrees, −45 degrees, +45 degrees and +90 degrees are employed, however other angular orientations are possible, depending on a variety of factors, including the particular application, and the geometry of the frame section 36. As previously discussed, in the case of the plies 52 containing the 0° tows (FIG. 5), the tows are substantially tangent to curvature 37 of the frame section 36 at substantially all points along the curvature 37.

Figure 9:
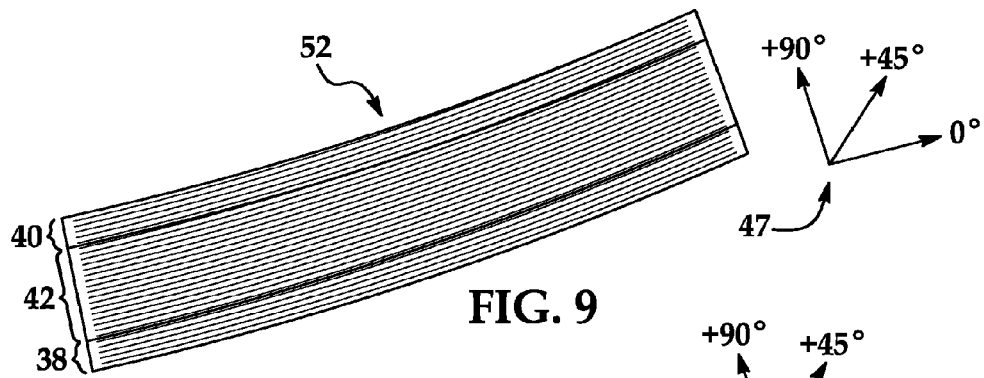
FIG. 9 is a plan illustration of a ply containing fibers oriented at 0 degrees.

Attention is now directed to FIGS. 9-12 which illustrate the fiber orientation in several plies of a flat ply stack 50. FIG. 9 illustrates a ply 52 in which the tows or tape strips are laid down by the AFP machine 58 (FIG. 6) with a 0 degree orientation, tangent to the curvature 37 (FIG. 8), extending the entire length of the frame section 36. As used herein, "tape" refers to pre-impregnated unidirectional fibers, and "tows" may comprise tape that is slit along it length into narrow bands which may be, for example and without limitation, 0.125, 0.25 or 0.5 inches in width. A "course" refers to tows applied as a band by the AFP machine 58. "Drops" refer to the AFP machine 58 discontinuing one or more tows, and may comprise the distance between adjacent tows or tape. A cut/add convergent zone means that a course terminates at a course of different orientation within the same ply, thereby creating areas of gaps and overlaps.

The 0 degree plies 52 may be formed by using the AFP machine 58 to "steer" the laydown of slit tape in which conformability and drop-offs determine the width of the ply 52. A full ply 52 is illustrated in FIG. 9, however a partial ply or a ply with drop-offs is possible as well. The sections of the ply 52 which later will be formed into the outer chord, inner chord and web are respectively designated by the numerals 38, 40 and 42. It should be noted here that in some applications, the plies forming the outer chord 40 may be formed using a separate band of tows or layer of tape that is precut to width and placed on later discussed tooling, rather than being laid down using the AFP machine 58.

Figure 10:
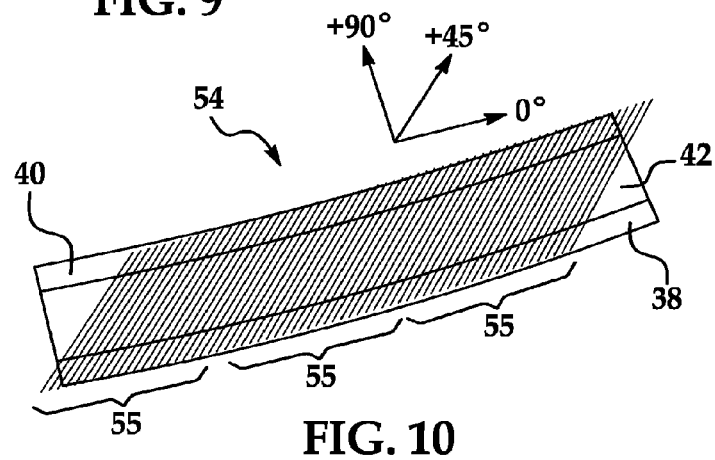
FIG. 10 is a diagrammatic illustration of plies respectively containing fibers oriented at 45 and 90 degrees, and illustrating the use of tow and tape wedges.

The plies containing tows or tape oriented at angles other than 0 degrees are formed by side-by-side groups or segments 55, 74 of the tows/tapes that each has a tapered wedge shape. The segments 55, 74 may be formed using tape with up angle and drop allowance which determines the sides. For example, FIG. 10 illustrates a ply 54 formed by segments 55 in which the fiber orientation in each of the segments 55 is generally +45 degrees.

Figure 11:
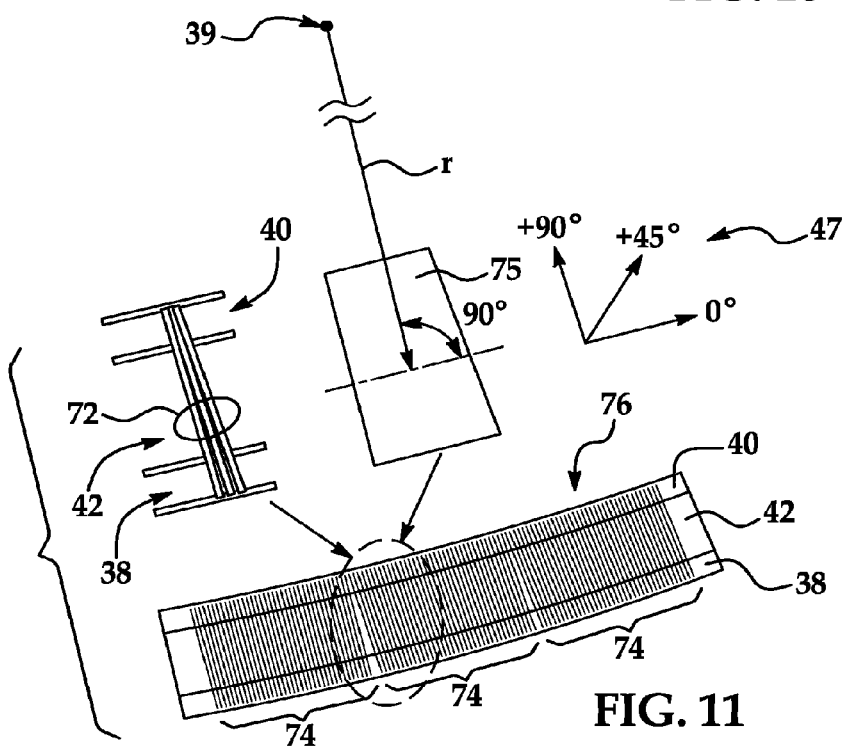
FIG. 11 is a perspective illustration of a flat stack of plies.

FIG. 11 illustrates a ply 76 formed by segments arranged side-by-side, in which the fibers in each segment 74 are oriented generally at 90 degrees, substantially aligned with the angle of the radial coordinate "r" defining the contour 37 (FIG. 8) of the frame section 36. Where tows 72 are laid down to form the segments 74, the individual tows are angled in the direction of the curvature of the ply 76. The angled tows 72 are individually placed in side-by-side relationship to each other. Alternatively, the segments may be formed by tapered wedges 75 of fiber tape that are laid down in side-by-side relationship to each other by the AFP machine 58 or a similar apparatus.

Figure 12:
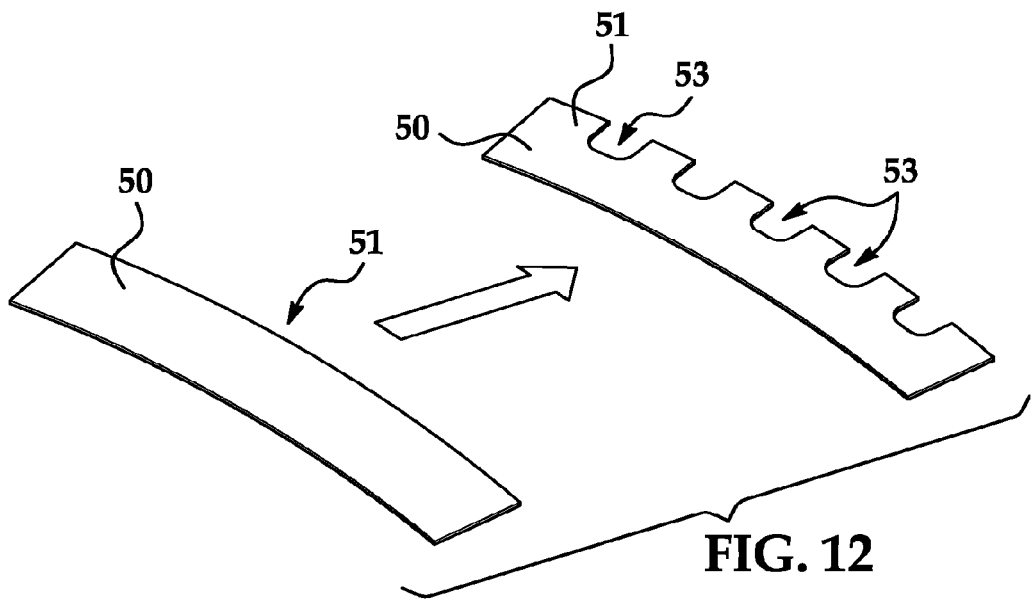
FIG. 12 is a perspective illustration similar to FIG. 11 but showing cut outs having been formed along one edge of the ply stack.

Referring now to FIG. 12, after the flat ply stack 50 has been fully placed, mousehole cutouts 53 may be created along one edge 51 of the ply stack 50. The cutouts 53 may be created using any of various techniques such as, by way of example and without limitation, using an NC controlled ultrasonic cutter (not shown).

In the illustrated example, the cutouts 53 provide openings through which the stringers 32b extend (FIG. 1). However, in other applications it may be desirable to provide similar cutouts 53 to reduce weight and/or reduce the possibility of ply wrinkling during subsequent fabrication processes.

Attention is now directed to FIGS. 13-17 which illustrate the formation of the inner chord 40 using a drape forming process. The ply stack 50 is placed on the upper flat surface 80a of a forming mandrel 80. The forming mandrel 80 includes a curved or contoured surface 80b which, in the illustrated example, forms a substantially 90 degree angle relative to the upper flat surface 80a. Any 0 degree plies that may be used to form the outer chord 40 are placed directly on the contoured surface 80b. An outer edge 50a of the ply stack 50 extends past the curved edge 80b and may be supported during ply placement by a layup shelf 86 that is subsequently moved to the position shown in FIG. 13. The forming mandrel 80 is supported on a vacuum bag tool 84, separated by a fiberglass breather 82. A vacuum bag 88 is placed over the ply stack 50 and forming mandrel 80. A breather 90 and a layer 92 of FEP (fluorinated ethylene propylene) may be placed between the bag 88 and the ply stack 50. The bag 88 can also have channels (not shown) on its inner surface, in which case the breather 90 is not required.

Figure 13:
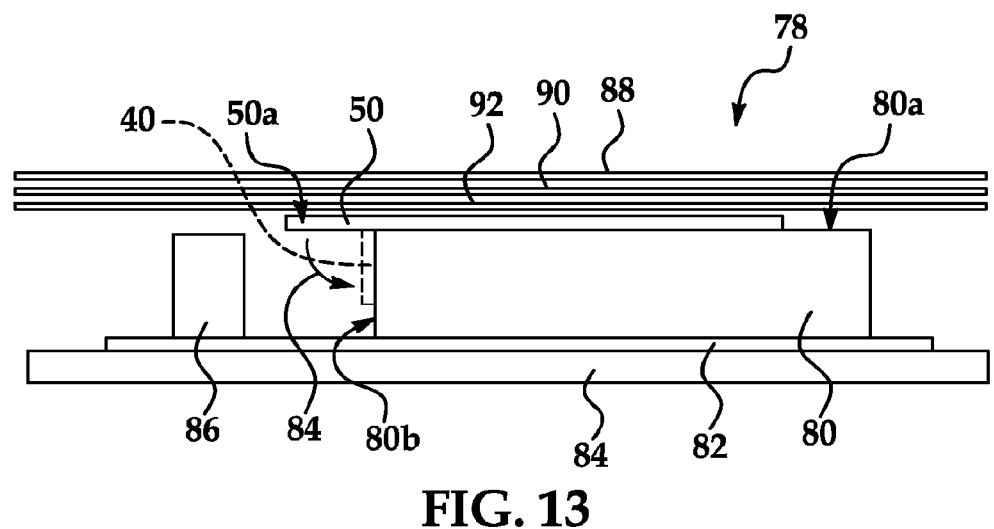
FIG. 13 is a cross sectional illustration showing a drape forming apparatus used to drape form an inner chord of the frame section.
Figure 14:
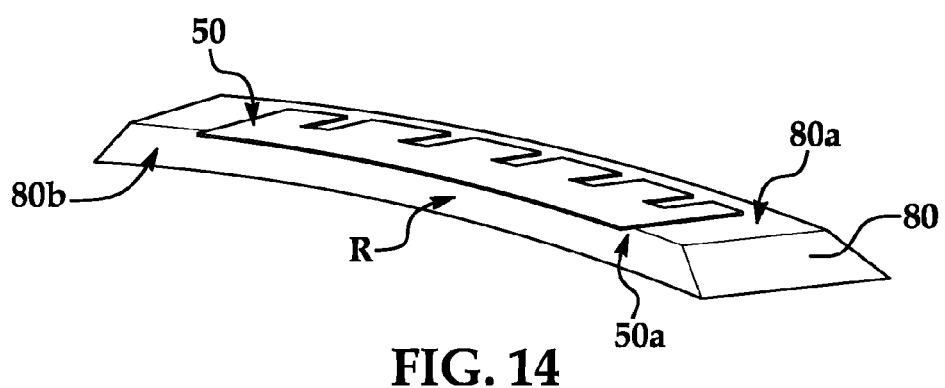
FIG. 14 is a perspective illustration of a flat ply stack positioned on a forming mandrel comprising part of the drape forming apparatus of FIG. 13.
Figure 15:
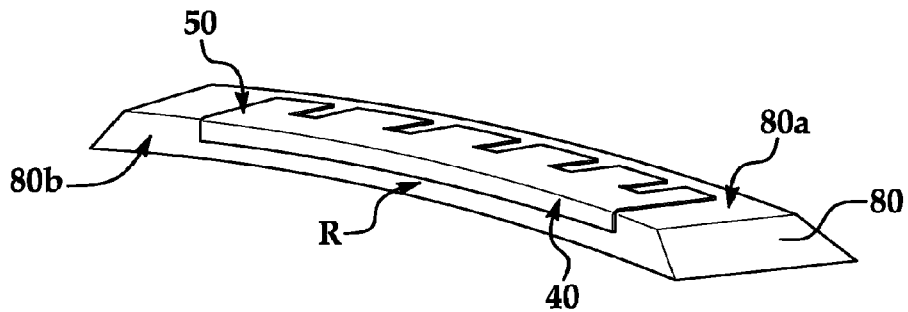
FIG. 15 is an illustration similar to FIG. 14 but showing the inner chord having been fully formed around the forming mandrel.

With the edge 50a of the ply stack 50 draped over the tool edge 80b, a vacuum is drawn in the bag 88 which applies pressure to the ply stack 50, causing the edge 50a to bend downwardly in the direction of the arrow 94 in FIG. 13 until the edge 50a lies substantially flat against and substantially assumes the contour of the forward face 80b of the forming mandrel 80. A ply stack edge 50a is thus formed into the inner chord 40 having a radius substantially identical to the radius R of the forward tool face 80b.

Figure 16:
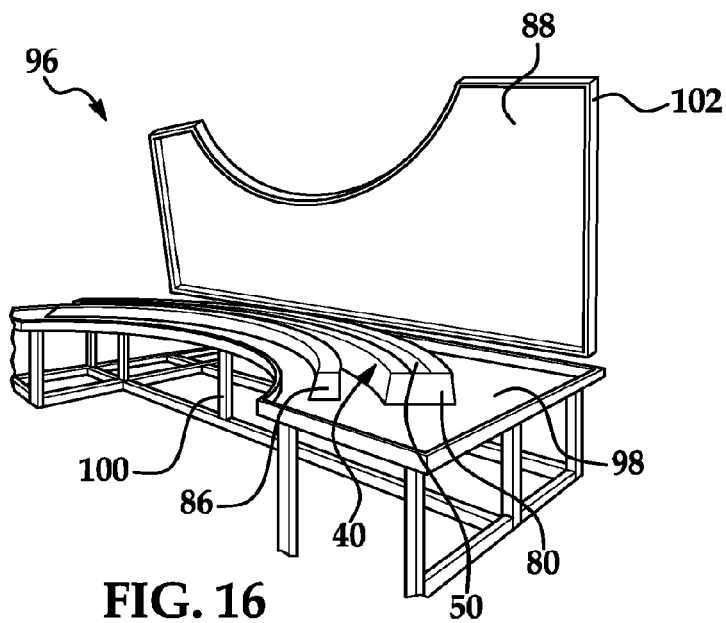
FIG. 16 is a perspective illustration of drape forming apparatus with a flexible membrane swung to an open position.
Figure 17:
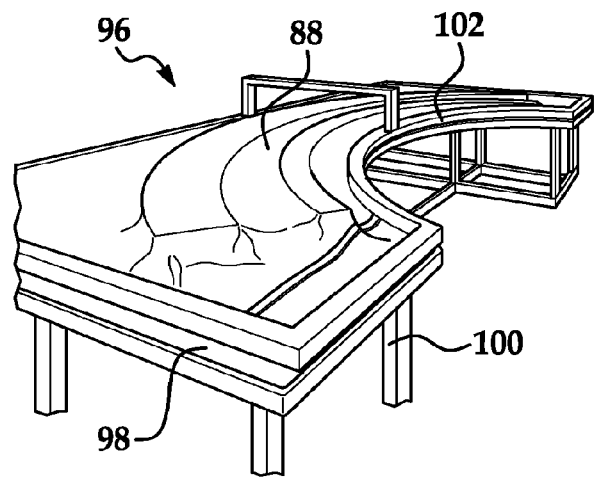
FIG. 17 is an illustration similar to FIG. 16 but showing the flexible membrane having been closed and drawn down around the tool assembly.

The forming process described above may be performed in a drape forming apparatus 96 shown in FIGS. 16 and 17. The bag 88 may comprise a gas impermeable membrane, formed, for example and without limitation, of silicone which is mounted in a frame 102 that is pivotally attached to a vacuum table 98 supported on legs 100. The vacuum table 98 includes ports or perforations (not shown) which allow air to be drawn through the table 98. The forming mandrel 80 along with the ply stack 50 and the layup shelf 86 may be placed on the vacuum table 98 with the frame 102 closed against the vacuum table 98.

As shown in FIG. 17, a vacuum system (not shown) may be used to evacuate the air in the sealed cavity formed by the frame 102 and table 98. Evacuation of this cavity results in the membrane 88 being drawn down over the forming mandrel 80, thus forming the edge 50a down over the front face 80b of the forming mandrel 80. The layup shelf 86 partially supports the membrane 88 during the formation process, thereby controlling and directing the force applied to the edge 50a of the membrane 88.

The inner chord 40 having been fully formed, the next step in the fabrication method is illustrated in FIGS. 18-21 in which the outer chord 38 is formed. The outer chord 38 may be fabricated by tension, hot drape forming using, for example and without limitation, the drape forming apparatus 124 shown in FIG. 19. The drape forming apparatus 124 includes a heated vacuum table 130 held in a lower frame 128 supported by legs 134. An upper, pivotal frame 126 includes a gas impermeable membrane 132 which may comprise silicone, for example. A tool in the form of a forming/cure mandrel 106 and a contoured block 112 are supported on the vacuum table 130 and are covered by the membrane 132 when the frame 126 is closed and sealed against the lower frame 128.

Figure 18:
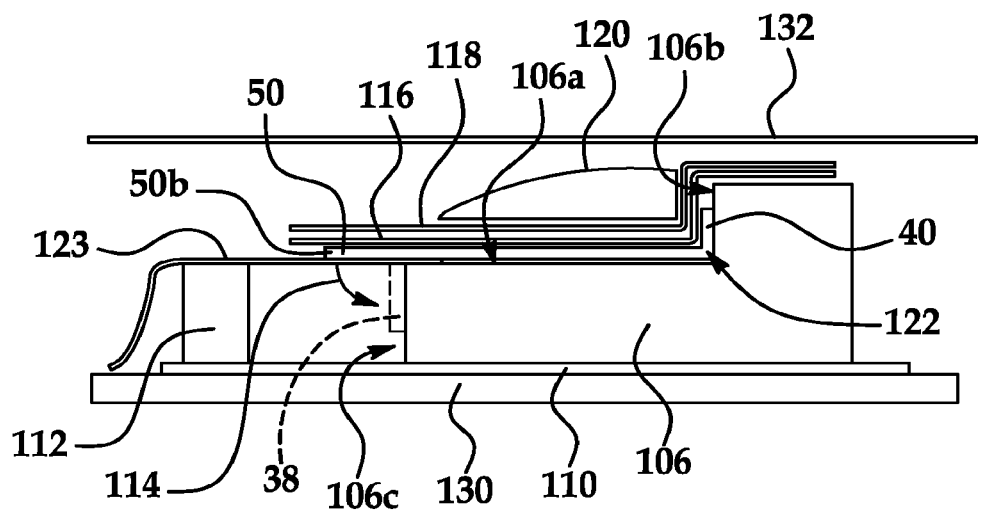
FIG. 18 is a sectional illustration of a hot drape forming apparatus for drape forming the outer chord of the frame section.
Figure 19:
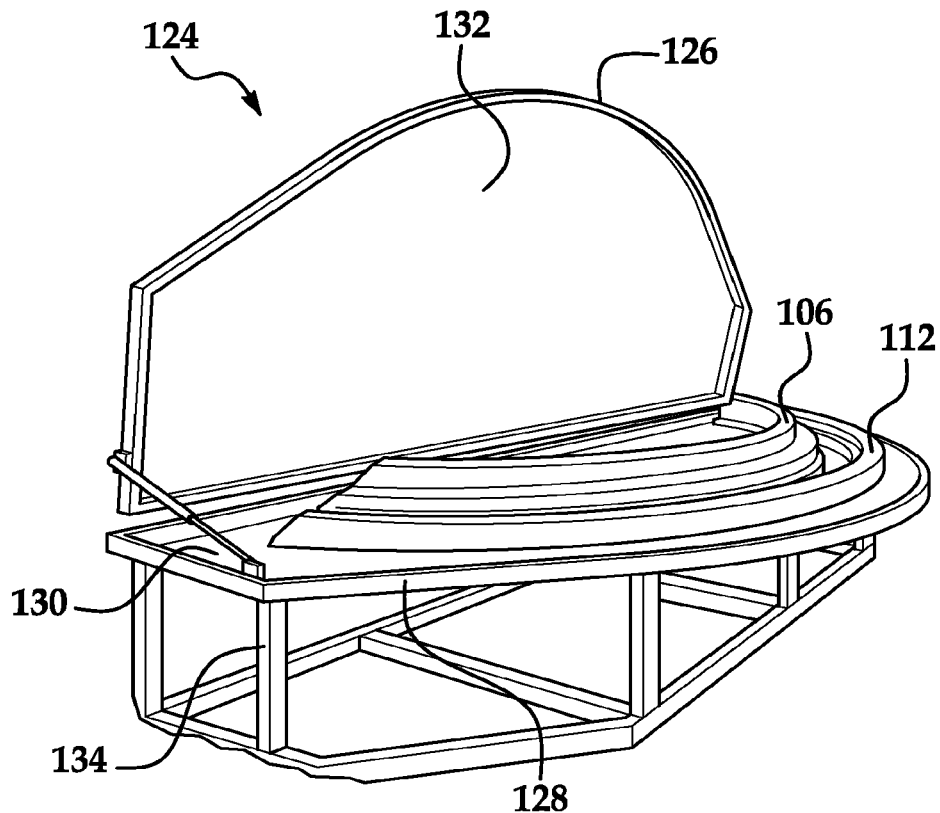
FIG. 19 is a perspective illustration of the hot drape forming apparatus shown in FIG. 18.

As best seen in FIG. 18, the forming/cure mandrel 106 includes a flat upper tool surface 106a which supports the ply stack 50. The second flat surface 106b on the forming/cure mandrel 106 extends upwardly from the tool surface 106a and engages the inner chord 40. The forming/cure mandrel 106 further includes a third surface 106c which extends downwardly from the tool surface 106a and is used to form the outer chord 38.

The forming/cure mandrel 106 is supported on the vacuum table 130. An optional breather 110 formed from fiberglass or other suitable material may be placed between the vacuum table 130 and the forming/cure mandrel 106. A contoured intensifier 120 may be placed over the ply stack in order to assure that the radius 122 is fully maintained adjacent the inner chord 40. A ply 116 of a material such, but not limited to Teflon® as well as a breather 118 may be placed between the intensifier and the ply stack 50. An additional layer 123 of FEP may be placed between an edge of the forming/cure mandrel and the ply stack 50. The FEP layer 123 is draped over the block 112, which in combination, function to control the angle at which the bag membrane 132 applies pressure to the outer edge 50b of the ply stack 50 during the drape forming process.

The outer chord 38 may be hot draped formed over the forming/cure mandrel 106 which may then be heated within an oven or by other means such as infrared lamps, to a preselected temperature for example, of approximately 140 degrees F. A vacuum is drawn in the bag membrane 132 and held for preselected periods of time. During the tension controlled hot drape forming process, the fibers can slide within a ply as a result of the viscosity of the matrix resin decreasing due to heating. This allows the fibers to bunch or spread, or otherwise rearrange themselves, as needed. Maintaining tension under the stack 50 minimizes wrinkling. The radius intensifier 120 holds the inner chord radius 122 (40a in FIG. 3) while forming the outer chord 38.

Figure 20:
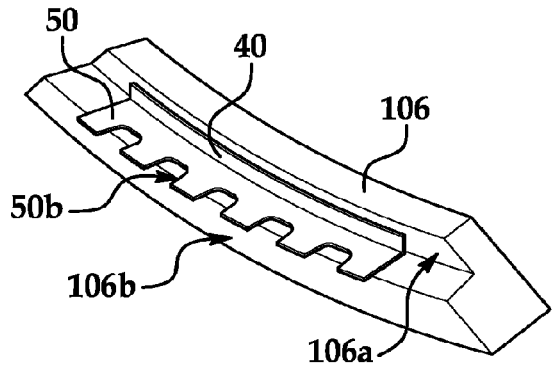
FIG. 20 is a perspective illustration of a forming/cure mandrel which comprises part of the drape forming tool assembly of FIG. 18, and depicting the partially formed frame section positioned thereon.
Figure 21:
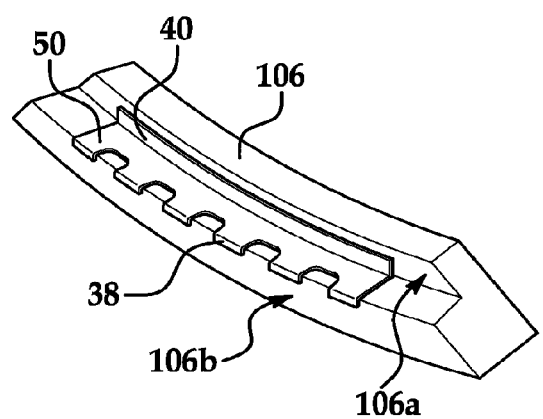
FIG. 21 is an illustration similar to FIG. 20 but showing the outer chord having been fully formed over the forming/cure mandrel.

FIG. 20 illustrates the partially formed ply stack 50 positioned on the forming/cure mandrel 106 with the formed inner chord 40 held against the tool surface 106a. The outer edge 50b of the ply stack 50 is cantilevered over the tool surface 106b. As shown in FIG. 21, when the membrane 132 is drawn down over the forming/cure mandrel 106, the membrane 132 applies pressure to the outer edge 50b at an angle that is partially controlled by block 112. The edge 50b of the ply stack 50 is then bent downwardly in the direction of the arrow 114 until it is fully formed against the tool surface 106c and forms the outer chord 38.

Figure 22:
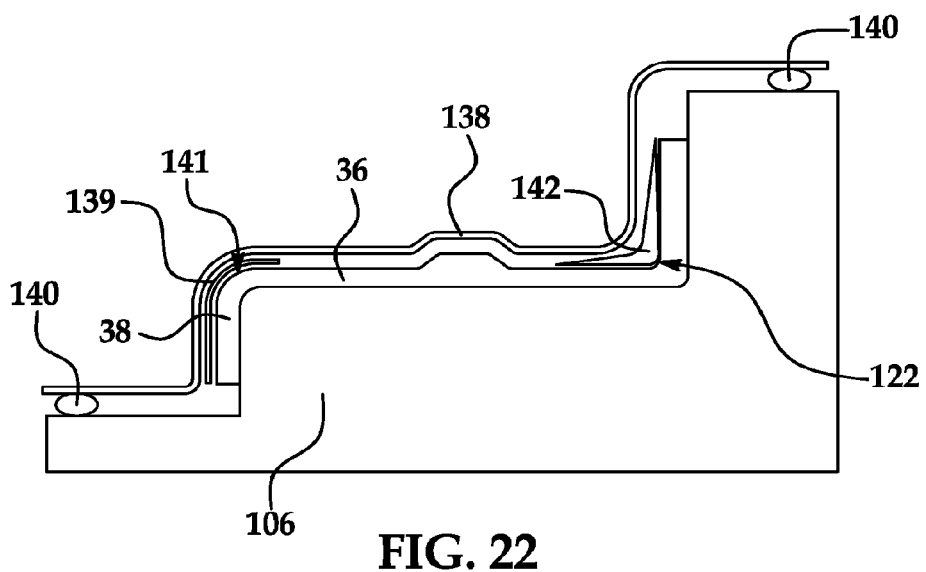
FIG. 22 is a sectional illustration of a forming/cure mandrel bag assembly used for curing the frame section.

When the inner and outer chords 38, 40 of frame section 36 having been formed, it is then necessary to cure the frame section 36, and in this connection, attention is directed to FIG. 22. The formed frame section 36 and forming/cure mandrel 106 are removed from the hot drape forming apparatus 124. A caul plate 139 may be placed over the outer chord 38 in order to assist in compacting the radius 141. Similarly, an intensifier 142 may be installed in order to aid in the compaction of the radius 122. A conventional vacuum bag 138 is placed over the frame section 36 and sealed by a seal 140 to the cure mandrel 136. A breather (not shown) and a peel ply (not shown) of FEP may also be placed between the forming/cure mandrel 106 and the bag 138.

Figure 23:
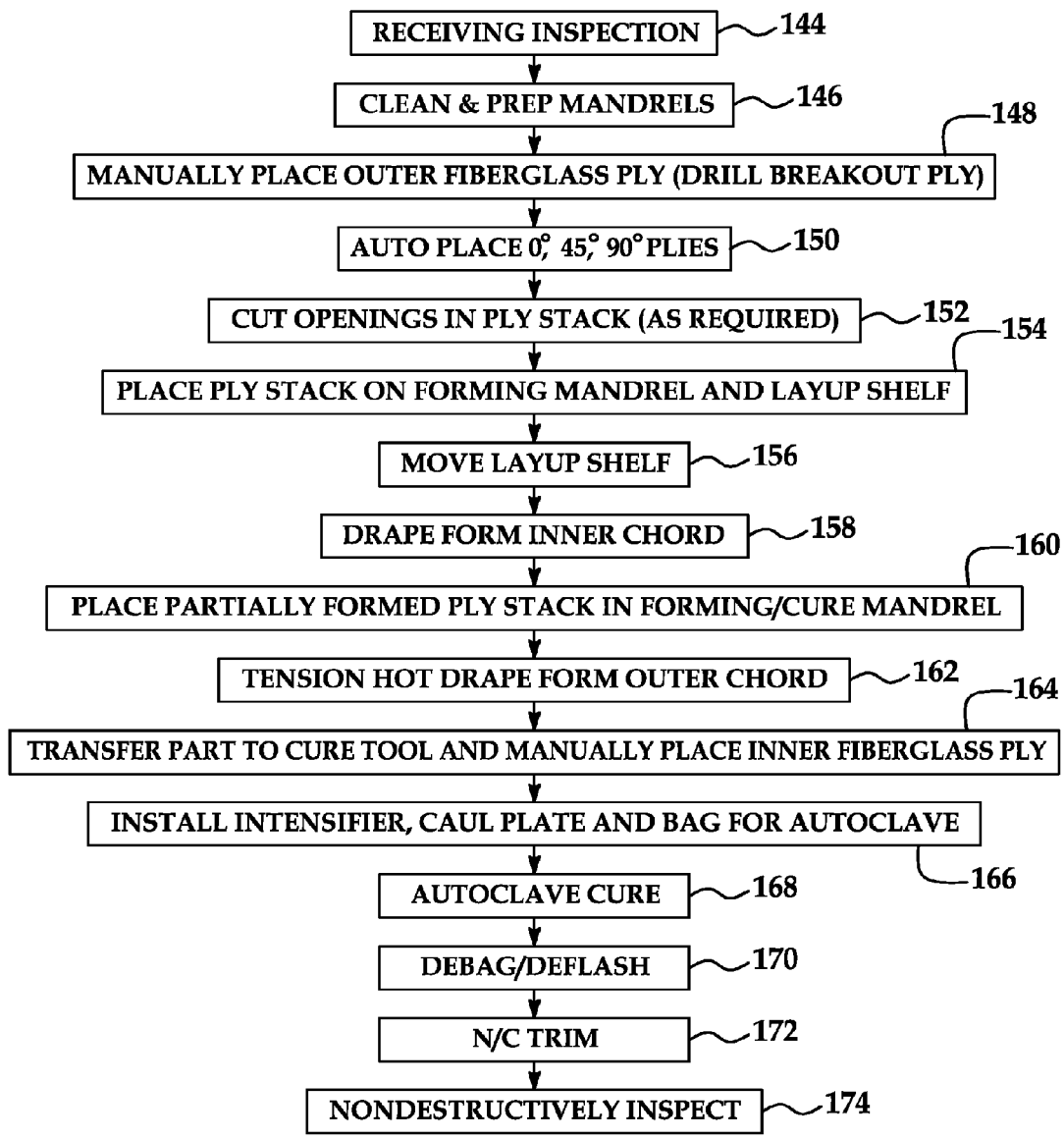
FIG. 23 is a flow diagram illustrating a method for fabricating continuous, contoured composite structures.

Attention is now directed to FIG. 23 which illustrates the overall steps used in the method for producing contoured composite structures. Raw materials, including pre-preg fiber tows and/or tape are received and inspected at 144. At 146, the previously discussed forming mandrel 80, and the forming/cure mandrel 106 are cleaned and prepared. Next, at 148, an outer fiberglass ply may be placed over the forming mandrel 80.

At step 150, all of the various plies in the stack 50 are laid down using one or more AFP machines 58. The flat ply stack 50 having been formed, the mousehole cutouts 53 are then put in the ply stack 50, as required at step 152. Next, at step 154, the ply stack 50 is placed on the forming mandrel 80 and layup shelf 86. Then at 156, the layup shelf 86 is moved to a position where it is used in the subsequent forming process. At step 158, the inner chord 40 is formed using the drape forming technique described above.

At step 160, the partially formed ply stack 50 is placed in the forming/cure mandrel 106. At 162 the outer chord 38 is hot draped formed on the forming/cure mandrel 106. Next, at step 164, the formed frame section 36 is transferred to the cure tool 136 and an inner fiberglass ply is placed over the frame. Next, at 166, the caul plate 139 and the intensifier 142 are installed, following which the assembly is vacuum bagged in preparation for autoclave curing. At 168 the frame section 36 is cured in an autoclave (not shown) following which, at 170, the cured, fully formed frame section 36 is debagged and deflashed. The frame section 36 may be trimmed at 172 using a numerically controlled cutter and the trimmed frame section may then be inspected at 174 using conventional nondestructive evaluation techniques.

Figure 24:
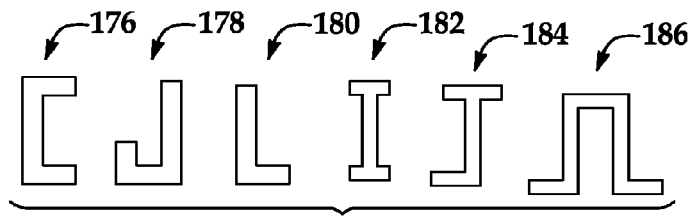
FIG. 24 illustrates cross sectional geometries of continuous composite structures that may be formed according to the disclosed embodiments.

While the disclosed embodiments illustrate use of the method to fabricate a contoured composite structure having a Z-shaped cross section, various other contoured structures are possible in which one or more legs extend outwardly from a structural feature such as a web. For example, as shown in FIG. 24, the disclosed embodiments may be employed to fabricate contoured, continuous structures having other leg configurations or cross sectional shapes, such as, without limitation, a C shape 176, a J shape 178, an L shape 180, an I shape 182, a modified J shape 184 and one or more forms of a U shape 186.

Figure 25:
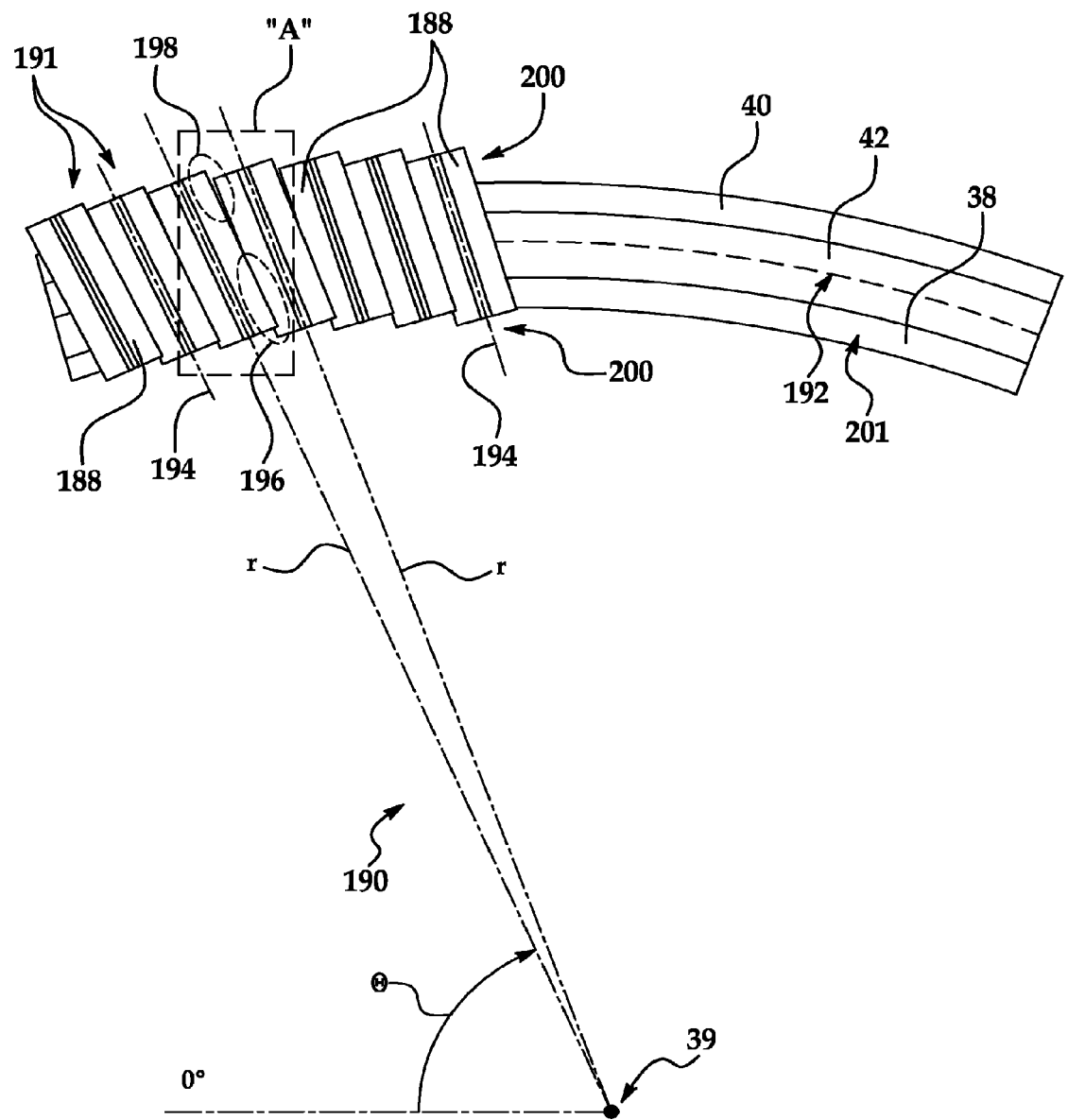
FIG. 25 illustrates a plan view of tape segments being placed on a substrate in relation to their alignment in a polar coordinate system.
Figure 26:
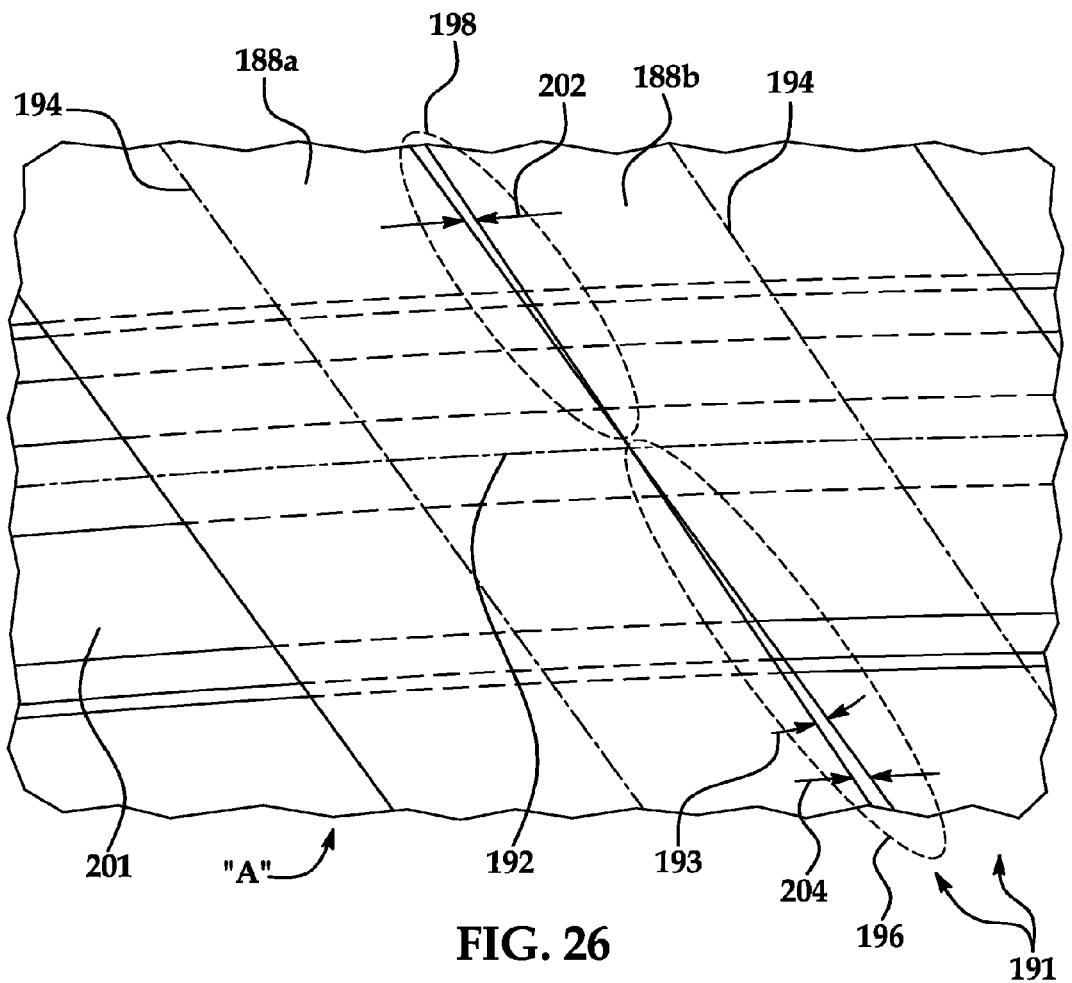
FIG. 26 is an enlarged illustration of the area designated as "A" in FIG. 25.

Attention is now directed to FIGS. 25 and 26 which illustrate another method for laying up a contoured ply 201 using overlapping ply segments 188 formed of substantially constant width, unidirectional pre-preg fiber tape. The constant width ply segments 188 may be cut from tape drawn from a spool (not shown) of standard or non-standard width tape. In the example shown in FIGS. 25 and 26, the ply segments 188 are substantially rectangular in shape, however, they may have other shapes, providing that the ply segments 188 have substantially the same widths. The ply segments 188 are placed on a substrate (not shown) and arranged along the contoured centerline 192 of a contoured ply 201 being laid up. Each of the ply segments 188 extends radially beyond the inner and outer chords 38, respectively, to form extensions 200 that are later trimmed so that the full ply 201 formed by the ply segments 188 substantially matches the contour of the structure 36 (FIG. 2).

Each of the ply segments 188 includes a longitudinal centerline 194 that is aligned during the placement process with a radial coordinate "r" originating from a pole 39 in a polar coordinate system 190. Each of the centerlines 194 form an angle θ relative to a reference line shown as "0°" in FIG. 25. The polar coordinate system 190 is used to define one or more contours of the structure (FIG. 2). According to the disclosed embodiments, the constant width tape segments 188 are placed in overlapping relationship 191 relative to each other such that the amount of overlap is preferably held substantially constant. As each ply segment 188 is placed, it is oriented at a slight angle 193 (FIG. 26) from the previously placed, adjacent segment 188. Placing the ply segments 188 in overlapping relationship 191 results in adjacent ones of the ply segments 188a, 188b forming a pie-shaped lap 196 near the inner chord 38, and a pie-shaped gap 198 adjacent the outer chord 40. The laps 196 and gaps 198 can be adjusted to meet structural requirements of a particular application by changing the width of the tape segments 188. The constant width tape layup method described above allows layup of non-zero plies at a relatively fast rate, even on small, highly contoured composite structures.

As best seen in FIG. 26, the lap 196 generally extends from the centerline 192 of the ply 201 in which the width 204 of the lap 204 grows progressively larger with increasing distance from the centerline 192. Similarly, the width 202 of the gap 198 between adjacent ply segments 188a, 188b grows larger with increasing distance from the centerline 192. According to the disclosed embodiments, both the laps 196 and the gaps 198 are substantially minimized. In contrast to the periphery cut tape segments used in the embodiment shown in FIG. 11, the use of simple, end cut ply segments 188 of constant width facilitate the use of automated equipment (discussed below) to place the ply segments 188 in a predetermined manner that minimizes the laps 196 and gaps 198.

The overlapping placement of constant width ply segments 188 as described above results in a ply 201 having substantially evenly displaced discontinuities defined by the laps 196 and gaps 198.

The width chosen for the tape segments 188 will vary with the application. Narrower tape segments 188 can be utilized in order to reduce the lap 196 and/or the gap 198. Similarly, wider tape widths may be employed to increase the lay-down rate. Laps 196 and gaps 199 for 45 degree plies 201 can be reduced by changing the ply segments 188 to a +/−60 degree orientations.

Figure 27:
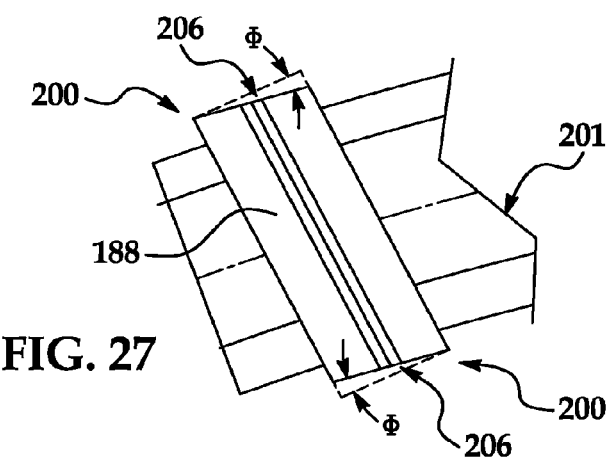
FIG. 27 is a plan view illustration of a single tape segment showing an alternate end cut.

Referring to FIG. 27, the overlapping ends 200 of each tape segment 188 may be cut at 206, at an angle Φ so as to substantially match the outer contours of the inner chord 38 and the outer chord 40, respectively. The cut ends 206 of the segments 188 therefore may substantially follow the contour of the structure 36 (FIG. 2), resulting in the segment 188 having a generally trapezoidal shape.

Figure 28:
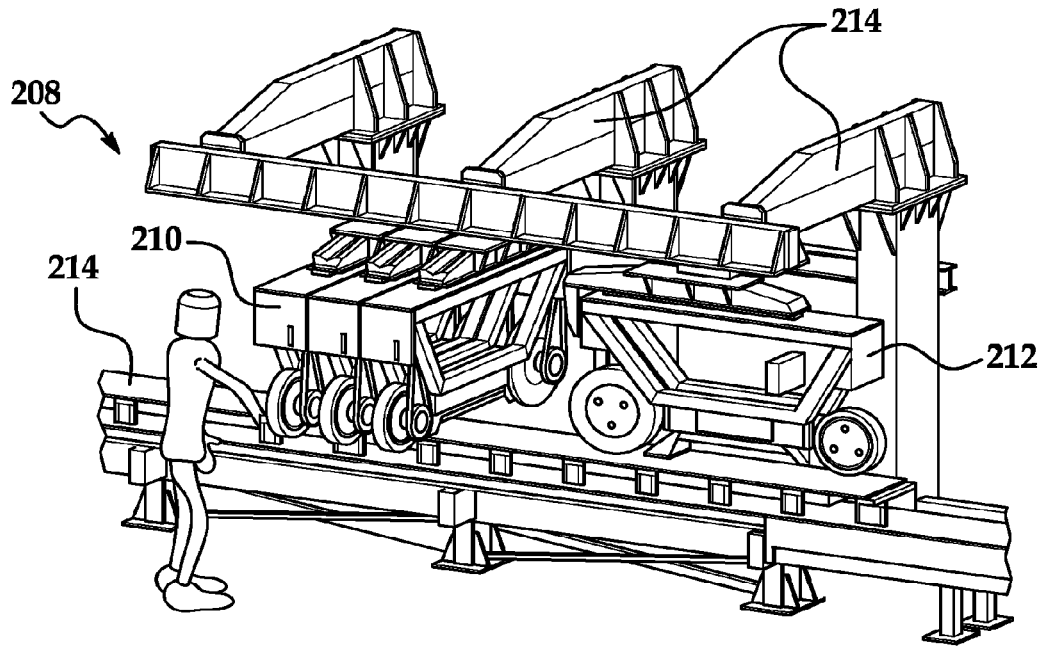
FIG. 28 is a perspective illustration of an automatic tape placement machine.

In accordance with the disclosed embodiments, each of the ply segments 188 may be placed on a substrate (not shown) using automatic tape placement equipment 208 shown in FIG. 28 which aligns the centerlines 194 (FIGS. 25 and 26) in polar orientations related to the contour of the structure 36 (FIG. 2). Referring to FIG. 28, the automatic tape placement equipment 208 includes pivotal tape placement heads 210, 212 mounted on a gantry 214 for pivotal motion relative to the contour of a substrate 214, which may be a tool. Each of the heads 210, 212 includes a supply of composite tape (not shown) along with cutting and placement mechanisms (not shown) that cut the tape to length and place the cut lengths of tape on the substrate 214. The tape heads 210, 212 and/or the substrate 214 are moved relative to each other so that the tape heads 210, 212 traverse across the substrate 214 and place composite tape automatically, typically under the control of a CNC controller (not shown). Additional details of a suitable automatic tape placement machine 208 are disclosed in U.S. Pat. No. 7,137,182 issued Nov. 21, 2006, the entire contents of which are incorporated by reference herein.

Figure 29:
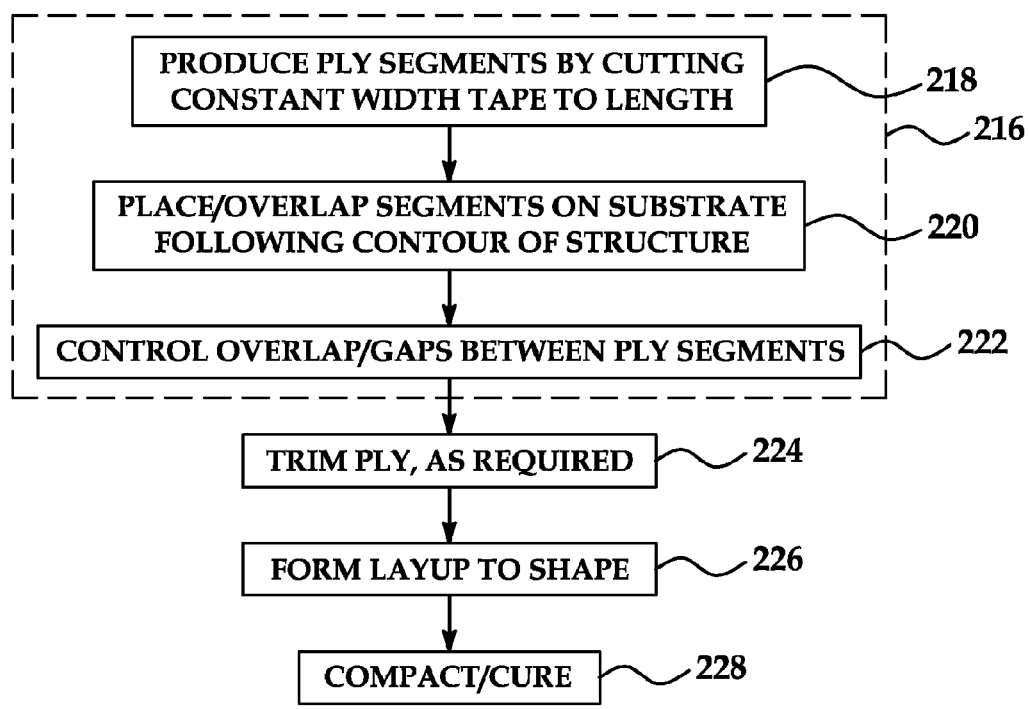
FIG. 29 illustrates a flow diagram of a method of fabricating a contoured composite structure using constant width tape segments.

Attention is now directed to FIG. 29 which illustrates the overall steps of method for making a contoured composite structure having one or more legs. A ply 201 is laid in a series of steps 216 that begin at 218, with the production of the ply segments 188 by cutting constant width, unidirectional fiber pre-preg tape to the desired lengths. Next at 220, the ply segments 188 are placed on a substrate in side-by-side, overlapping relationship which follows the contour of the composite structure. During the placement process, the longitudinal centerlines 194 of the ply segments 188 are aligned in a polar orientation related to the contour of the structure. At 222, the overlap 196 and gaps 198 between adjacent ply segments 188a, 188b is controlled. Typically, this control is implemented automatically when using automated tape placement equipment, of the type shown in FIG. 28.

At 224, each complete ply 201, or a stack of plies 201 may then be trimmed to final shape, as required. At 226, the completed ply stack 50 (FIG. 8) may be formed to shape using techniques previously described herein, which may include forming one or more legs. Finally, at 228, the shaped ply stack 50 may be compacted and cured.

Figure 30:
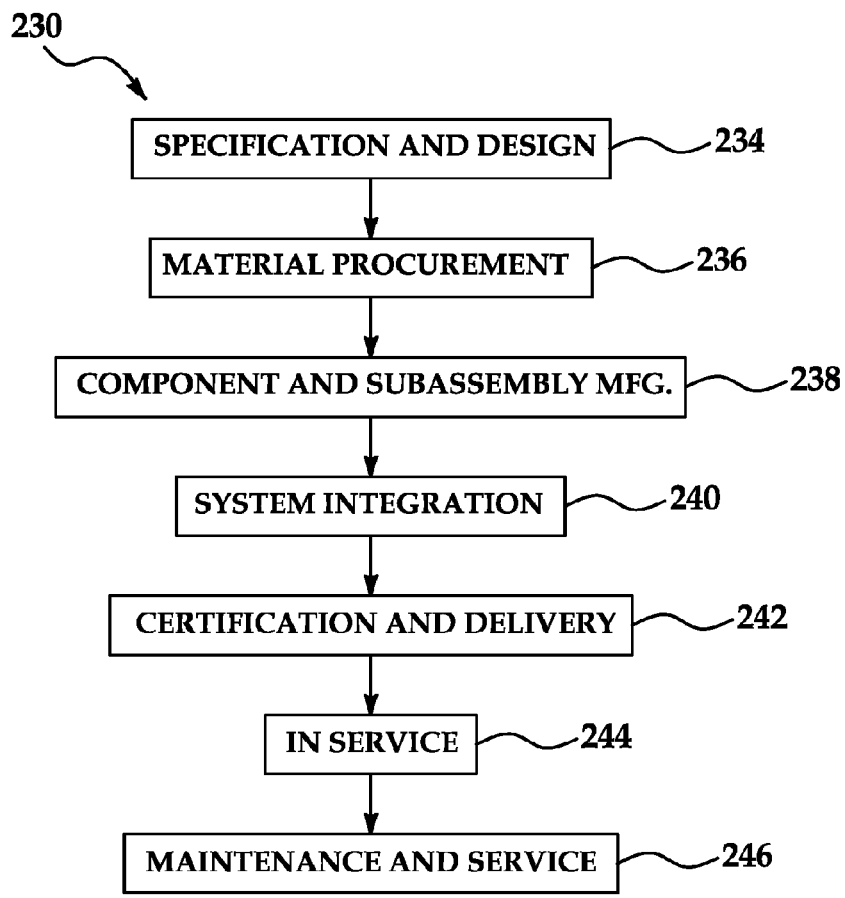
FIG. 30 illustrates a flow diagram of aircraft production and service methodology.
Figure 31:
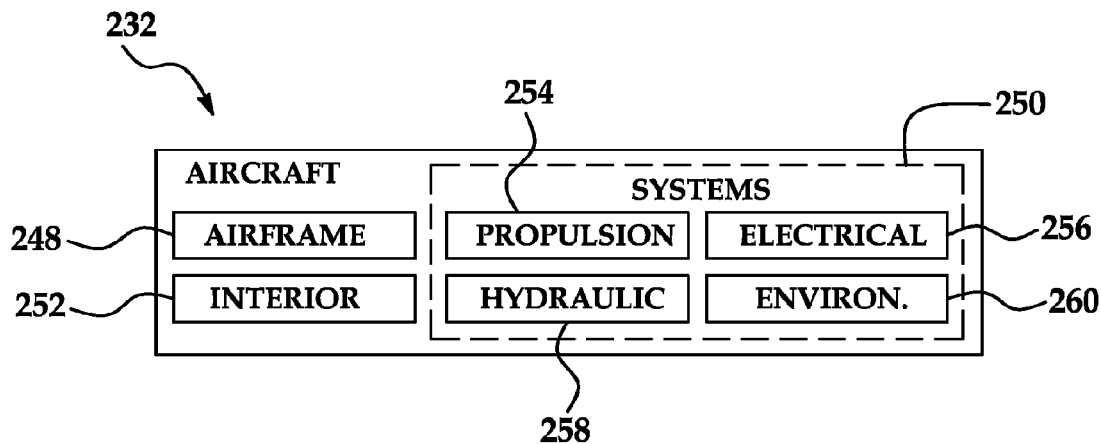
FIG. 31 illustrates a block diagram of an aircraft.

Embodiments of the disclosure may find use in a variety of potential applications, particularly in the transportation industry, including for example, aerospace, marine and automotive applications. Thus, referring now to FIGS. 30 and 31, embodiments of the disclosure may be used in the context of an aircraft manufacturing and service method 230 as shown in FIG. 30 and an aircraft 232 as shown in FIG. 31. Aircraft applications of the disclosed embodiments may include, for example, without limitation, composite stiffened members such as stiffeners, beams, and stringers, to name only a few. During pre-production, exemplary method 230 may include specification and design 234 of the aircraft 230 and material procurement 236 in which the disclosed contoured structures are specified for use in the aircraft 232. During production, component and subassembly manufacturing 238 and system integration 240 of the aircraft 230 takes place, in which various components and subassemblies are fabricated using the disclosed method. Thereafter, the aircraft 232 may go through certification and delivery 242 in order to be placed in service 244. While in service by a customer, the aircraft 232 is scheduled for routine maintenance and service 246 (which may also include modification, reconfiguration, refurbishment, and so on), which may include the use of the disclosed contoured structures.

Each of the processes of method 230 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 31, the aircraft 232 produced by exemplary method 230 may include an airframe 248 with a plurality of systems 250 and an interior 252. Examples of high-level systems 250 include one or more of a propulsion system 254, an electrical system 256, a hydraulic system 258, and an environmental system 260. Any number of other systems may be included. Although an aerospace example is shown, the principles of the disclosure may be applied to other industries, such as the marine and automotive industries.

Systems and methods embodied herein may be employed during any one or more of the stages of the production and service method 230. For example, components or subassemblies corresponding to production process 208 may be fabricated or manufactured in a manner similar to components or subassemblies produced while the aircraft 232 is in service. Also, one or more apparatus embodiments, method embodiments, or a combination thereof may be utilized during the production stages 238 and 240, for example, by substantially expediting assembly of or reducing the cost of an aircraft 232. Similarly, one or more of apparatus embodiments, method embodiments, or a combination thereof may be utilized while the aircraft 232 is in service, for example and without limitation, to maintenance and service 246.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A curved aircraft frame comprising a composite laminate comprising multiple plies that form a web and an outer chord such that:
   the outer chord comprises a first tailored axial modulus and a cutout through which a stringer may extend;
   at least one laminate ply in the multiple plies comprises continuous reinforcing fibers configured to extend an entire length of the curved aircraft frame substantially tangent to a hoop direction of the curved aircraft frame at substantially all points along a curvature of the curved aircraft frame;
   a gauge of the outer chord comprises a first quantity of plies;
   a first section of the web comprises a second tailored axial modulus and a first gauge of the web comprising a second quantity of plies;
   a second section of the web comprises a third tailored axial modulus and a second gauge of the web comprising a third quantity of plies;
   the first quantity of plies varies from the second quantity of plies and the third quantity of plies via at least one tow in at least one ply layer comprising a drop;
   the second quantity of plies exceeds the third quantity of plies; and
   the first tailored axial modulus, the second tailored axial modulus, and the third tailored axial modulus each differ with respect to each based upon a desired compression loading, radial stiffness, and shear load transfer capability desired for each of the outer chord, the first section of the web, and the second section of the web, such that at least one laminate ply in the multiple plies comprises substantially evenly displaced discontinuities.

2. The curved aircraft frame of claim 1, wherein the composite laminate comprises a one-piece, unitary construction and a cross section comprising at least one of a Z-shape and a J-shape, such that the Z shape comprises an inner chord comprising a fourth quantity of plies comprising a gauge of the inner chord, the fourth quantity of plies varying from: the first quantity of plies, and the second quantity of plies.

3. The curved aircraft frame of claim 1, wherein the composite laminate includes:
   an inner chord integrally formed with the web and extending laterally outward from a first end of the web,
   the outer chord adapted to be fastened to an aircraft skin, the outer chord being integrally formed with the web and extending laterally outward from a second end of the web in a first direction being opposite to a second direction of lateral extension of the inner chord, and the first tailored axial modulus being based upon a desired fastener bearing.

4. The curved aircraft frame of claim 3, wherein at least certain of the multiple plies extend substantially continuously through the web, the inner chord and the outer chord in the direction of the curvature of the frame.

5. The curved aircraft frame of claim 1, wherein:
   the plies each include a polymer matrix, and
   the fibers include carbon fibers held within an epoxy matrix.

6. The curved aircraft frame of claim 1, further comprising the composite laminate being a vacuum formed multi-ply composite laminate.

7. The aircraft frame of claim 1, further comprising a pad-up configured with a tailored axial modulus based upon 0° fibers being tangent to the hoop direction at substantially all points and laminate orientation percentages.

8. The curved aircraft frame of claim 1, further comprising:
   the first section of the web comprising a pad-up, the pad-up being integrated within the web and comprising the first gauge of the web; and
   each of the multiple plies comprising a same resin and a same fiber as every other ply in the multiple plies, and each ply formed as a pre-preg tow in the form of a slit tape.

9. An aircraft fuselage frame, configured as one-piece in a curved shape and comprising:
   multiple ply layers:
   a web comprising:
     a first end;
     a second end;
     a first section;
     a second section;
     a first gauge comprising a first ply buildup; and
     a first tailored axial modulus, such that the first section comprises a pad-up integrated within the web, the pad-up comprising a greater number of ply layers and a greater gauge than comprise the second section of the web;
   an inner chord, on the first end of the web, comprising a second ply buildup and a second tailored axial modulus;
   an outer chord, on the second end of the web, comprising a third ply buildup and a third tailored axial modulus; and
   the web, the inner chord, and the outer chord being integrally formed and comprising laminated plies comprising fiber reinforced resin such that:
     each of the first ply buildup, the second ply buildup, and the third ply buildup differ with respect to each other at least via at least one tow in at least one ply layer in the multiple ply layers comprising a drop; and
     each of the first tailored axial modulus, the second tailored axial modulus, and the third tailored axial modulus differ with respect to each other based upon a desired compression loading, radial stiffness, and shear load transfer capability desired for each of the inner chord, the outer chord, and the web, such that at least one ply in the multiple ply layers comprises substantially evenly displaced discontinuities.

10. The aircraft fuselage frame of claim 9, wherein the outer chord is adapted to be fastened to a fuselage outer skin and the pad-up comprises a 0° degree fiber content of 40-50%.

11. The aircraft fuselage frame of claim 9, wherein at least certain of the laminated plies extend substantially continuously through the web, the inner chord and the outer chord.

12. The aircraft fuselage frame of claim 9, wherein at least one of: the web, the inner chord, and the outer chord comprise plies comprising continuous unidirectional reinforcing fibers configured to extend an entire length of the aircraft fuselage frame and that lie substantially tangent to a curvature of the frame.

13. The aircraft fuselage frame of claim 9, wherein each of: the web, the inner chord and the outer chord comprise plies comprising continuous unidirectional reinforcing fibers configured to extend an entire length of the aircraft fuselage frame and that lie substantially tangent to a curvature of the frame, and at least one ply buildup comprises a partial ply.

14. The aircraft fuselage frame of claim 9, such that the laminate comprises: unitary construction, and a cross section shape being at least one of: of a Z, and a J.

15. The aircraft fuselage frame of claim 9, further comprising the pad-up configured with a tailored axial modulus based upon 0° fibers being tangent to a hoop direction of the aircraft fuselage frame at substantially all points and laminate orientation percentages.

16. The aircraft fuselage frame of claim 9, wherein the outer chord comprises a cutout section configured to accommodate a stringer.

17. The aircraft fuselage frame of claim 9, wherein the laminated plies comprise a layup of fiber reinforced resin plies such that a quantity of the fiber reinforced resin plies varies along a length of the laminated plies.

18. A curved composite fuselage frame, comprising:
a one-piece, multi-ply laminate comprising a cross section comprising:
    a web;
    an inner chord, and
    an outer chord comprising a cutout through which a stringer may extend, the outer chord configured as an integrated shear tie fastenable to a skin on a fuselage, the inner and outer chords being respectively positioned on opposite ends of the web and extending outwardly from the web in opposite directions, such that the multi-ply laminate comprises fiber reinforced resin plies configured to extend an entire length of the curved composite fuselage frame such that a quantity of the fiber reinforced resin plies varies-along a length of the one-piece, multi-ply laminate via at least one tow in at least one ply comprising a drop; and such that a respective gauge for each of:
the web, the inner chord, and the outer chord each comprise a unique ply buildup and a uniquely tailored axial modulus based upon a desired compression loading, radial stiffness, and shear load transfer capability for each of the web, the inner chord, and the outer chord; and
the web comprising a pad-up comprising a first section of the web, the first section being integrated within the web and comprising more ply layers and a greater gauge than comprise a second section of the web, such that at least one ply in the multi-ply laminate comprises substantially evenly displaced discontinuities.

19. The curved composite fuselage frame of claim 18, further comprising the cross section comprising a shape substantially being one of: a Z, and a J, and the tailored axial modulus of the outer chord being based upon a desired fastener bearing.

20. The composite fuselage frame of claim 18, wherein each of: the web, the inner chord and the outer chord comprise plies comprising continuous unidirectional reinforcing fibers that lie substantially tangent to a curvature of the frame and at least one ply buildup comprises a partial ply.

21. The curved composite fuselage frame of claim 18, such that at least certain plies extend substantially continuously through the web, the inner chord and the outer chord in the direction of a curvature of the frame.

22. The curved composite fuselage frame of claim 18, further comprising the pad-up configured with a tailored axial modulus based upon laminate orientation percentages.

23. A composite frame for an aircraft fuselage, the composite frame being one-piece and comprising:
    a multi-ply composite laminate, each ply comprising an angular fiber orientation relative to an adjacent ply, defining: a web, an inner chord, and an outer chord, configured as an integrated shear tie to connect the composite frame to an outer skin on the aircraft fuselage; the outer chord configured to extend laterally upward from a first end of the web, and comprise a first tailored axial modulus and a cutout through which a stringer may extend;
    the inner chord configured to extend laterally outward from a second end of the web in a direction opposite of that of the outer chord, and comprise a second tailored axial modulus;
    the web comprising a pad-up comprising a first section of the web, the first section being integrated within the web and comprising more ply layers and a different gauge than comprise a second section of the web, such that the first section comprises a third tailored axial modulus, and the second section comprises a fourth tailored axial modulus; and
    each of: the web, the inner chord, and the outer chord comprising plies comprising continuous reinforcing fibers, such that a gauge of the web, a gauge of the inner chord, and a gauge of the outer chord each comprise a respective unique quantity of ply layers; at least certain of the plies comprise reinforcing fibers oriented substantially tangent to a curvature of the frame substantially along an entire length of the curvature, and at least one tow in at least one ply comprising a drop; such that the first tailored axial modulus, the second tailored axial modulus, the third tailored axial modulus, and the fourth tailored axial modulus each differ from one another based upon a desired compression loading, radial stiffness, and shear load transfer capability for each of the first section, the second section, the inner chord, and the outer chord, such that at least one ply in the multi-ply laminate comprises substantially evenly displaced discontinuities.

24. The composite frame of claim 23, such that at least certain plies extend substantially continuously through the web, the inner chord, and the outer chord, in the direction of the curvature of the frame.

25. The composite frame of claim 23, such that the web, inner chord, and outer chord comprise a shape substantially of at least one of: a Z, and a J.

* * * * *